United States Patent [19]

Udd

[11] Patent Number: 5,311,592
[45] Date of Patent: May 10, 1994

[54] SAGNAC INTERFEROMETER BASED SECURE COMMUNICATION SYSTEM

[75] Inventor: Eric Udd, Huntington Beach, Calif.

[73] Assignee: McDonnell Douglas Corporation, Long Beach, Calif.

[21] Appl. No.: 940,618

[22] Filed: Sep. 4, 1992

Related U.S. Application Data

[63] Continuation-in-part of Ser. No. 880,684, Jun. 11, 1986, Pat. No. 5,223,967, and a continuation-in-part of Ser. No. 880,685, Jun. 11, 1986, Pat. No. 5,274,488, and a continuation-in-part of Ser. No. 772,626, Oct. 4, 1991, which is a continuation of Ser. No. 628,950, Dec. 14, 1990, abandoned, which is a continuation of Ser. No. 409,509, Aug. 28, 1989, abandoned.

[51] Int. Cl.$^5$ .......................... H04L 9/00; H04B 10/02
[52] U.S. Cl. ........................................... 380/9; 380/49; 380/54; 359/118; 359/119; 359/164; 359/173; 359/183; 359/188; 359/195
[58] Field of Search ...................... 380/3, 4, 9, 49, 54, 380/59; 359/109–111, 115, 118, 119, 152, 164, 168, 173, 180, 183, 188, 189, 193, 195, 181

[56] References Cited

U.S. PATENT DOCUMENTS 3,647,275  3/1972  Ward ..................... 380/54
4,482,980  11/1984  Korowitz et al. .............. 359/119 X
4,784,453  11/1988  Shaw et al. ..................... 359/173 X Primary Examiner—Bernarr E. Gregory
Attorney, Agent, or Firm—Pillsbury Madison & Sutro

[57] ABSTRACT

A secure fiber optic communication system capable of tens of gigabits/second data transfer rates that utilizes a pair of single mode fiber optic cables in combination with one or more light sources, phase modulators, detectors and polarization scrambling elements to form a Sagnac interferometer. The phase modulator is driven so that counter propagating light beams in the Sagnac loop experience a different optical path as they pass through the loop. When the two beams are recombined on the central beamsplitter of the Sagnac loop, the two beams interfere with each other and the data impressed as phase modulation on the light beams by the phase modulator is recovered as amplitude modulation on the output detector of the Sagnac interferometer. The system can be configured to operate full duplex on two optical fibers by using light at different wavelengths or time division multiplexing data. The system can also be configured as a multi-node network. Alarms, intrusion control, random pathlength changes and the like can be included to make undetected, unauthorized access to the system even more difficult.

93 Claims, 19 Drawing Sheets

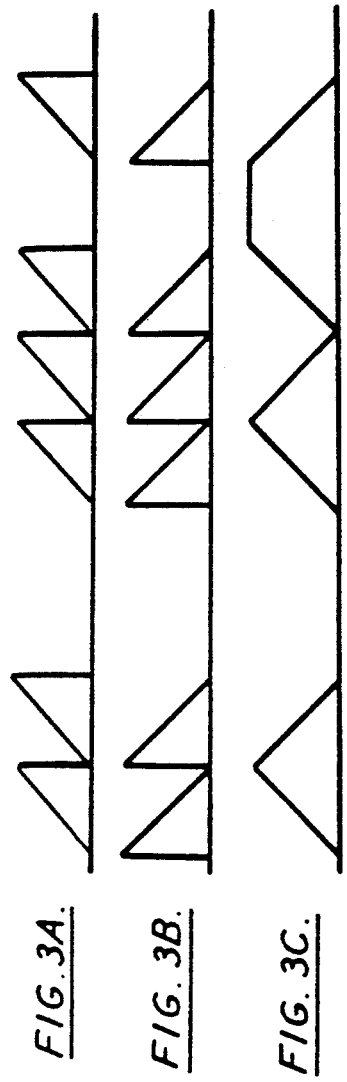
FIG. 3A.
FIG. 3B.
FIG. 3C.
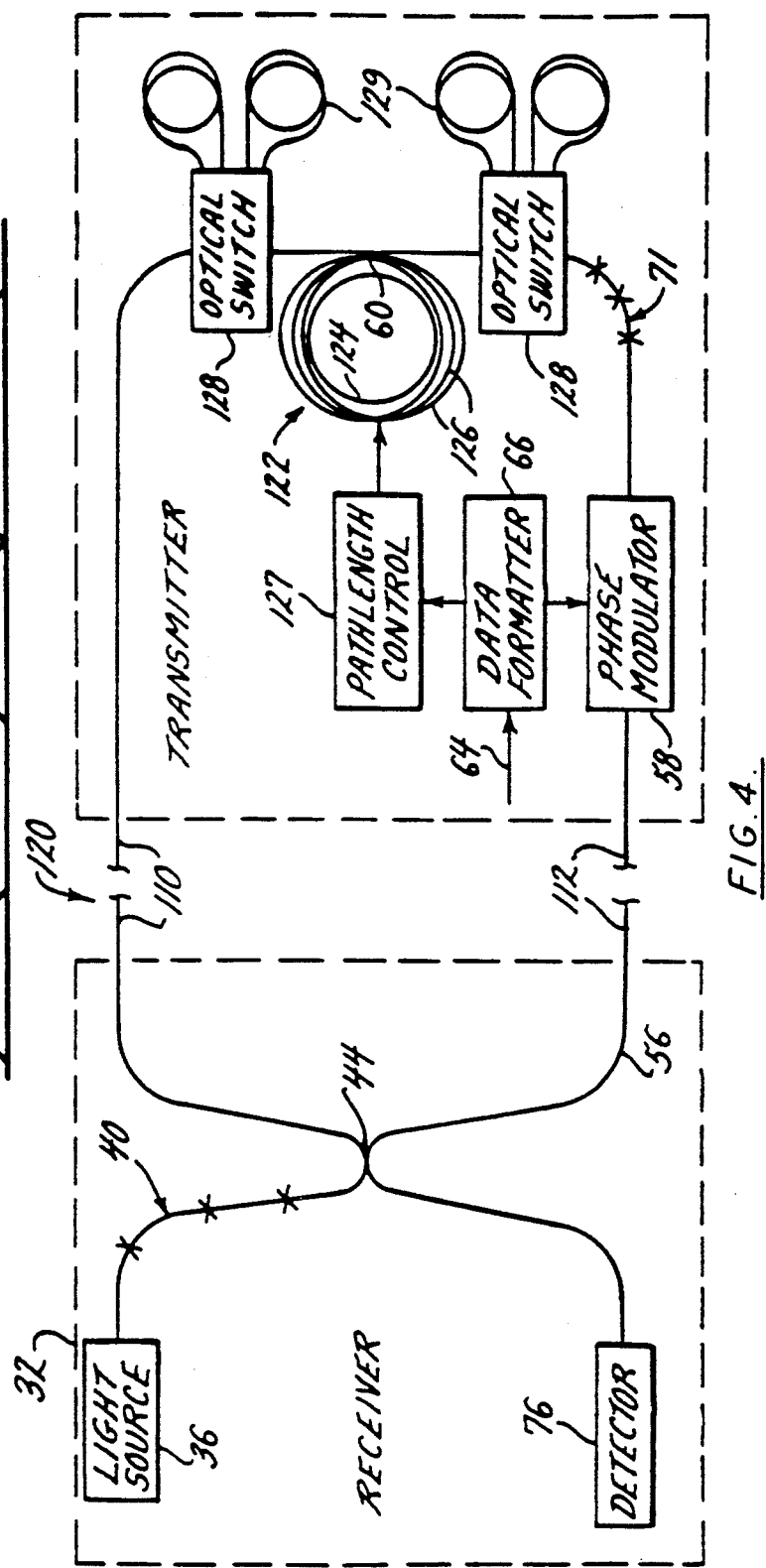
FIG. 4.

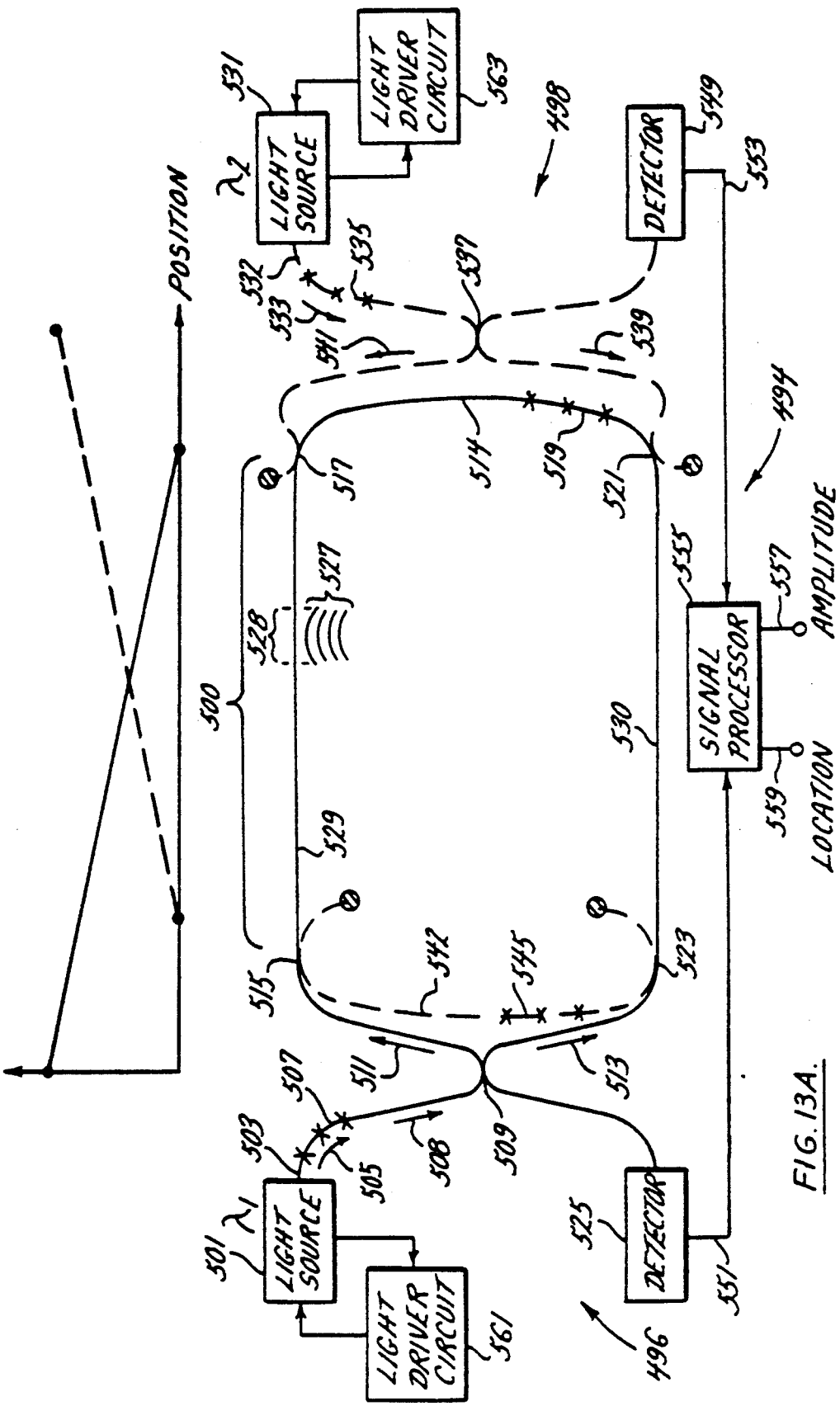

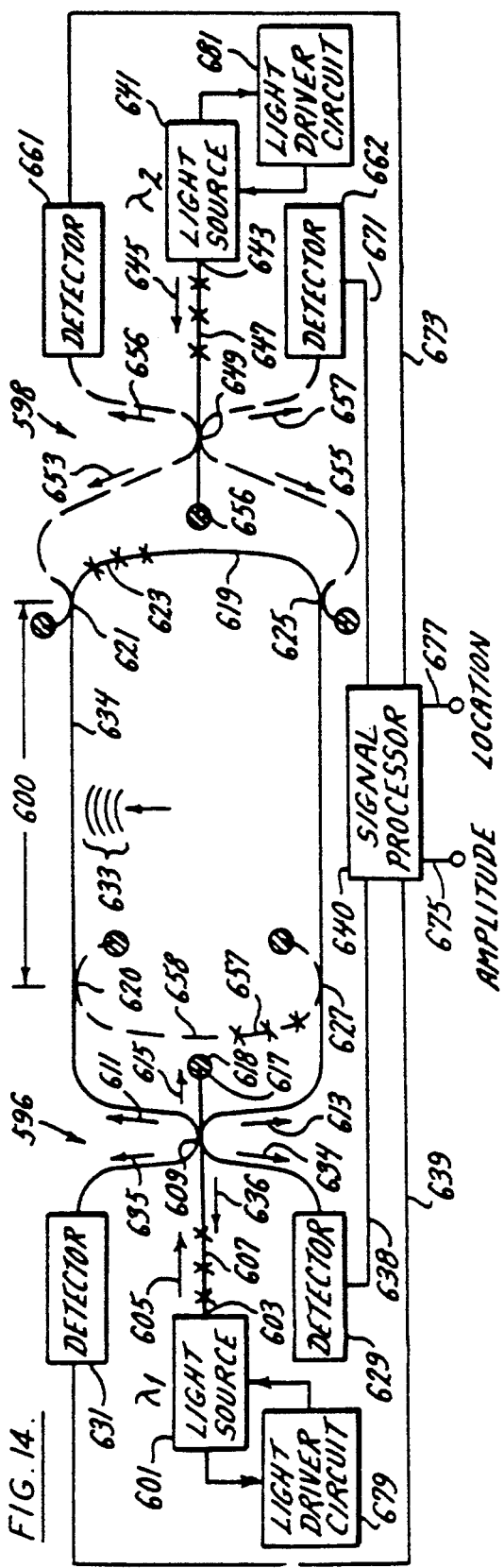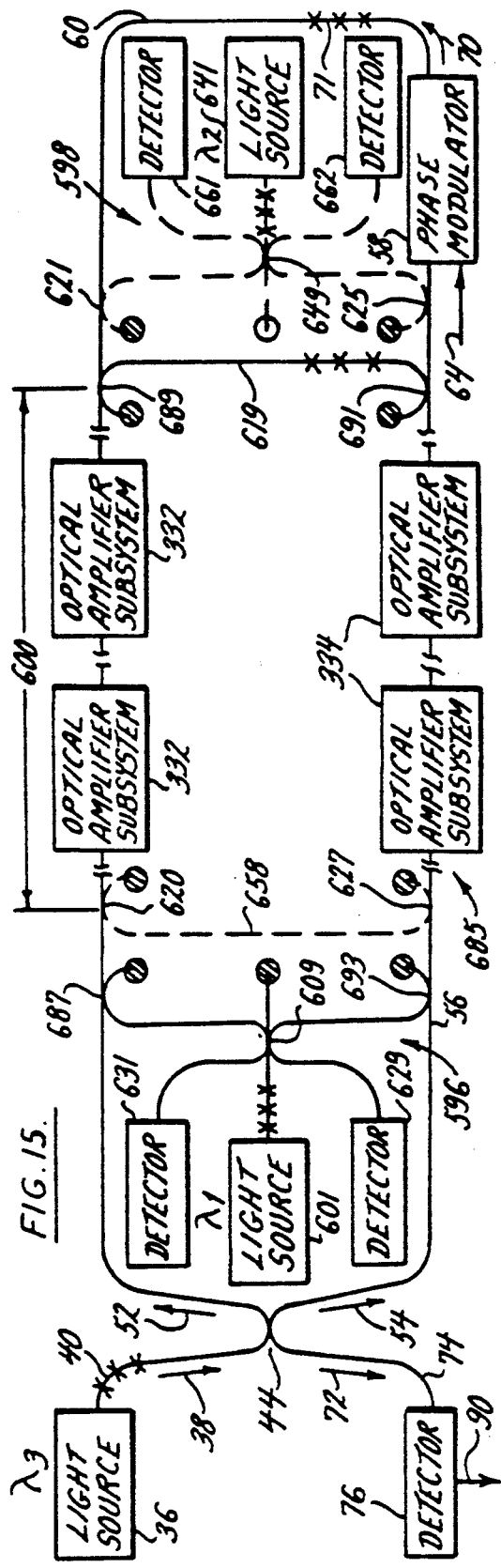
FIG. 14.
FIG. 15.

SAGNAC INTERFEROMETER BASED SECURE COMMUNICATION SYSTEM

This is a continuation in part of copending application Ser. No. 880,684 filed on Jun. 11, 1986, now U.S. Pat. No. 5,223,967, Ser. No. 880,685 filed on Jun. 11, 1986, now U.S. Pat. No. 5,274,488, and Ser. No. 07/772,626 filed on Oct. 4, 1991 which is a continuation of Ser. No. 07/628,950 filed Dec. 14, 1990, now abandoned, which is a continuation of Ser. No. 409,509 filed Aug. 28, 1989, now abandoned.

TECHNICAL FIELD

This invention relates to the field of secure communication and the protection of valuable data. More particularly this invention involves secure fiber optic communication systems that have application to point to point communication links and the support of secure communication networks.

BACKGROUND ART

Currently, cryptographic techniques are used to secure data during transmission electronically where the entire communication system is not physically secure. These techniques often involve complex keys and key holders to assure security, driving up the overall operating cost of this type of system. The most secure of the cryptographic units that are affordable, are limited in speed, running at a maximum data throughput of approximately $50 \times 10^6$ bits/sec. (50 MBPS). This limitation is brought on because of computer overhead required by cryptographic techniques. To circumvent some of these problems Hughes Aircraft Co. has developed a secure fiber optic communication system that is based on the protection afforded by a guard mode. The guard mode carries a large amount of optical energy protecting a data carrying mode that has a relatively small amount of optical energy. When an intrusion is attempted, the light from the guard mode leaks out, an alarm trips, and the system shuts down. The Hughes system uses a costly special optical fiber to preserve the integrity of the alarm and data carrying modes. It is currently limited to operation at 13 MBPS over a maximum distance of 1.5 km. Also because of difficulties associated with mode integrity, the Hughes system is very difficult to implement where connectors must be used.

More recently, the Sagnac interferometer has been suggested as a means to support data communications using Faraday rotation (*A Pseudo-Reciprocal Fiber-Optic Faraday Rotation Sensor: Current Measurement and Data Communication Applications,* by P. Akhavan Leilabady, A. P. Wayte, M. Berwick, J. D. C. Jones, and D. A. Jackson, Optics Communications, Volume 59, Number 3, page 173-176, Sep. 1, 1986). This system uses twisted single mode optical fiber to reduce birefringence effects. However, it relies on toroidal current to generate magnetic fields and can be expected to operate at very low speeds of less than 1 MBPS. This system may also be susceptible to noise induced by stray magnetic fields, as one of its primary purposes is to measure current via the magnetic field induced Faraday effect.

Secure data communication links are needed that operate at high speed for everyday business, as well as government use. Banks transfer huge amounts of money by electronic means, usually computer to computer. They need means to assure that someone cannot intercept the data stream to change the recipient of the funds, change the amount transferred, or gain knowledge of who is transferring money where and to whom. Lawyers, accountants and securities brokers have need for absolute security in their corporate merger, acquisition, buyout and investment work to assure that advance information cannot be acquired by others before public notice, since acquisition of such information by an unscrupulous individual can result in fortunes being made or lost and liability to the lawyer, accountant or broker. Many businesses have proprietary information, such as financial data, costs, advanced product data that must be transferred electronically, where access by unauthorized people could result in ruin. Few, if any, persons outside of government can afford the slow, computer intensive, dedicated secure communication systems heretofore available. Therefore, there has been a need to provide economical secure data communication systems that can use existing fiber optic cables for high rate data transfer without resorting to encryption.

DISCLOSURE OF INVENTION

The present invention is an economical secure fiber optic communication system for the transmission of data signals at high data rates that can be used with the existing, unprotected, fiber optic cables commonly used for non secure communication. Once data is placed in the communication systems of the present invention, for all intents and purposes, it can not be extracted except by an authorized user, nor can someone surreptitiously corrupt the communicated data. The present communication systems are based on a Sagnac interferometer and the secure communication is accomplished on the legs of a Sagnac loop. The basic system includes transmitter and receiver portions. The receiver portion includes a light source that preferably produces a spectrally broadband beam of light. If polarization preserving optical fiber is not used in the Sagnac loop, the light beam has its polarization scrambled prior to being fed to a central beamsplitter to prevent problems associated with polarization changes in the light beam. The scrambled light beam is split into two beams, which for convenience are called clockwise (cw) and counterclockwise (ccw) beams hereafter, by the central beamsplitter for travel in opposite directions around the fiber optic Sagnac loop.

The transmitter portion of the system includes a phase modulator offset from the center of the loop, the center being defined as the point on the loop optically equidistant on both legs from the central beamsplitter. The input data stream to be communicated is input to the phase modulator in a format suitable for transmission, but there is no requirement for encryption. The phase modulator introduces a phase shift in the counter propagating beams which carries the input data. The two beams travel about the remainder of the Sagnac loop and are combined at the central beamsplitter into a beam which is transmitted to a detector.

When the two light beams combine, they interfere with each other. If the two light beams are 180° out of phase when they reach the central beamsplitter, all of the light therein is directed toward the output detector and if they are in phase all the light is directed back to the light source. This converts the phase differences into amplitude modulations in the light signal that are sensed by the detector, which produces an electrical output signal representative of the input data stream.

A number of approaches may be employed to format the input data for transmission on the Sagnac secure fiber optic communication system. The data may be "bursted" into the system, the Sagnac interferometer's natural differentiation may be used, or various time and/or frequency multiplex methods may be employed.

The system has several intrinsic security features. Since the light source is on continuously, an intruder tapping light from the system would see what looked like a defective link. Since the information is carried in phase rather than amplitude, the signal is riding on the frequency of the light beam. This then implies that along with constructing a tap that takes so few photons, they are not missed, an intruder attempting a passive tap must build an interferometer with the same physical length (to within the coherence length of the light source that may be a few tenths of micrometers) as the system must be built to beat down the carrier frequency to detectable levels. There are several modifications to the basic system to make this increasingly difficult, such as providing a random path length generator in the loop that might provide a change in pathlength from millimeters to kilometers and do so at intervals less than a millisecond. Other protective features that can be built into the basic system include light level detection alarms that increase the difficulty of an intrusion, alarms that use coherent detection methods as well as use of a distributed alarm system that allows the localization of a potential intruder, or the usage of a low coherence light source such as a light emitting diode or fiber laser. Further complicating matters are environmental effects which, to first order, are canceled out in the Sagnac secure fiber optic communication system but can couple directly into some prospective interferometric taps. It is also possible to configure the Sagnac loop so that its legs are not collocated, making tapping of both much more difficult.

While the security features of the present secure communication system are substantial, the Sagnac loop type of secure fiber optic communication systems can be used with commercial optical cables to operate over very long distances, and is economical to configure for building to building communications within a local complex, such as between bank offices and the bank's financial computer.

Therefore, it is an object of the present invention to provide an extremely secure communication system that can use existing optical cable runs.

Another object of the invention is to provide a secure communication system that will operate at high speeds (many GBPS are possible) as well as slow and moderate communication rates.

Another object is to provide a secure communication system that is highly resistant to noise induced by electromagnetic effects.

Another object is to provide a secure communication system for both digital and analog data.

Another object of the invention is to enable the detection of an intrusion attempt on an fiber optic communication system.

Another object is to allow the determination of the location of an intruder on an fiber optic communication system.

Another object is to provide economic secure communication over very long distances without the requirement for physically secured repeaters.

Another object is to provide secure fiber optic networks.

These and other objects and advantages of the present invention will become apparent to those skilled in the art after considering the following detailed specification including the drawings wherein:

BRIEF DESCRIPTION OF DRAWINGS

FIGS. 3A, 3B, and 3C show various sawtooth input waveforms that may be used to drive the system of FIG. 1 that result in square wave outputs through the differentiation action of the Sagnac interferometer;

FIG. 4 is a schematic diagram of a modified secure communication system similar to that shown in FIG. 1, employing a random pathlength generator in the Sagnac loop to enhance security;

FIG. 13A is a schematic diagram of a basic wavelength division multiplexed Sagnac distributed sensor useful in securing communication systems;

FIG. 13B is a graph of response vs. position for the system of FIG. 13A;

FIG. 14 is a schematic diagram of a modified wavelength division multiplexed Sagnac distributed sensor using 3 by 3 couplers to provide a passive bias to optimize sensitivity;

FIG. 15 is a schematic diagram of the modified wavelength division multiplexed Sagnac distributed sensor of FIG. 14 combined with the Sagnac loop of the system of FIG. 1, modified with optical amplifiers for communication over large distances;

BEST MODES FOR CARRYING OUT THE INVENTION

Figure 1:
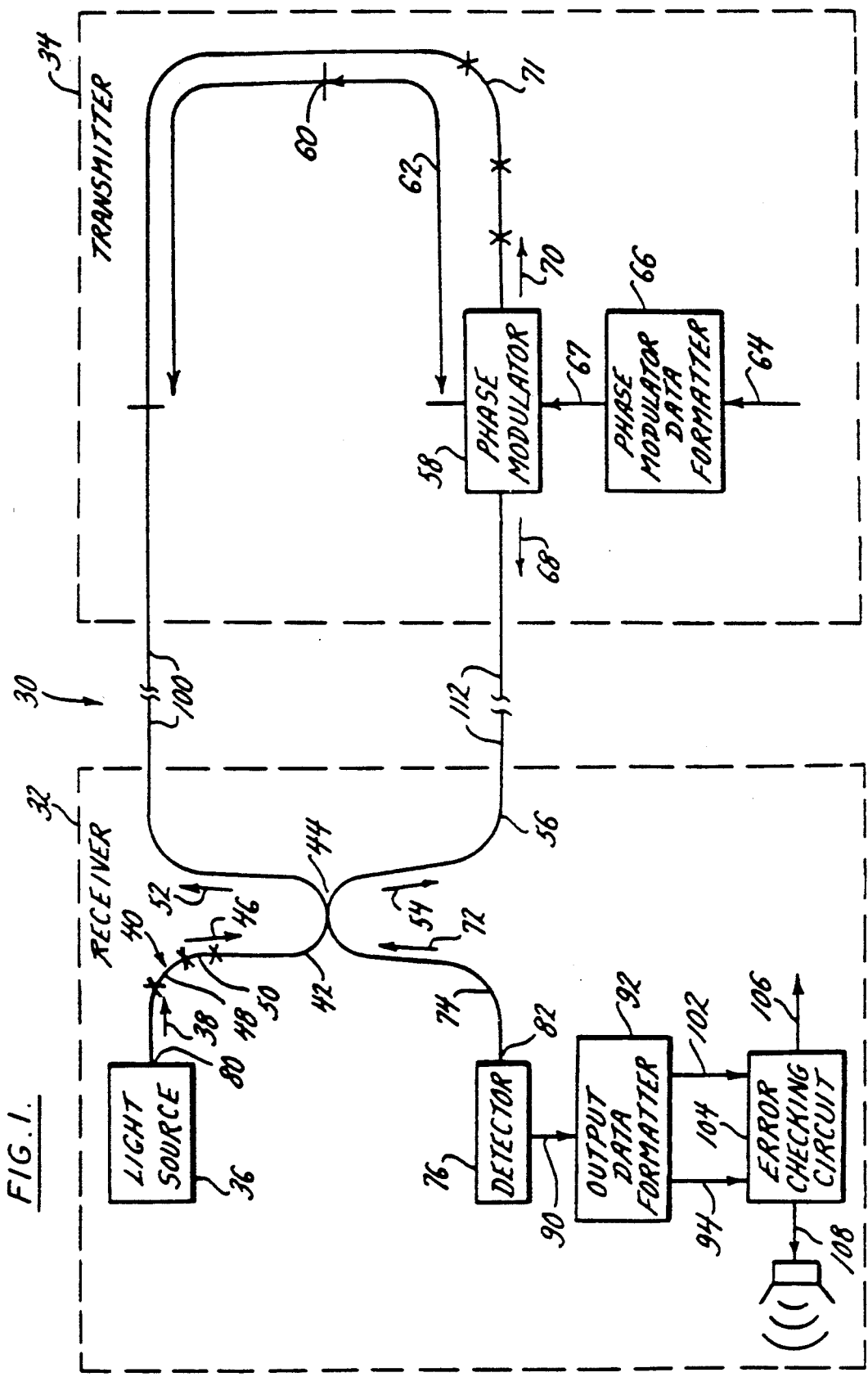
FIG. 1 is a schematic presentation of a Sagnac interferometer based secure fiber optic communication system.

Referring to the drawings more particularly by reference numbers, number 30 in FIG. 1 refers to a basic secure fiber optic communication system based on a Sagnac interferometer. The system 30 includes a receiver portion 32 and a transmitter portion 34. The receiver portion 32 includes a light source 36 such as a light emitting diode, a fiber laser or a laser diode that produces a spectrally broadband beam 38 of light. The beam 38 may have a preferred polarization state. To prevent problems associated with polarization changes in the light beam 38, it is propagated through a polarization scrambler 40 positioned in one arm 42 of a central beamsplitter 44. The scrambler or depolarizer 40 scrambles the polarization of the beam 38 to allow the system 30 to be constructed from low cost, conventional, telecommunications grade, single mode optical fiber. If polarization preserving fiber is used in the system 30, then the polarization scrambler 40 is not needed.

The polarization scrambler 40 may be a Lyot depolarizer consisting of two lengths 48 and 50 of polarization preserving birefringent fiber. Although some polarization preserving birefringent fiber has other than an elliptical cross-section, when elliptical cross-section, polarization preserving birefringent fiber is used, the major axes thereof are spliced at 45° with respect to each other to form the Lyot depolarizer. As a specific example, if the light source 36 is a light emitting diode operating at 1.3 microns wavelength with a spectral half width of 40 nanometers and Fujikura polarization preserving birefringent fibers are used, the lengths of the fibers 48 and 50 employed for polarization scrambling, to within a few percent, are 0.5 meters and one meter respectively. Generally it is much more economical to manufacture and install such a fiber depolarizer 40 than to use polarization preserving fiber throughout the system 30.

The scrambled beam 46 is split into a clockwise beam 52 and a counterclockwise beam 54 by the central beamsplitter 44 so that the beams 52 and 54 travel in opposite directions around a fiber optic Sagnac loop 56.

The transmitter portion 34 of the system 30 includes a phase modulator 58 offset from the center 60 of the loop 56 by a distance 62. The phase modulator 58 may be an integrated optic or electro-optic phase shifter. An integrated optic phase shifter offers very high speed operation in a small, low powered configuration whereas electro-optic phase shifters may be available at lower cost. An input data stream 64 is input to the phase modulator 58. If the input data stream 64 is not in the proper form for application to the phase modulator 58, the data stream 64 is passed through a phase modulator data formatter 66 and converted into a phase modulator input signal 67 that is in the proper form. The phase modulator 58 receives beams 52 and 54 and introduces a phase shift therein to produce phase shifted beams 68 and 70 from beams 52 and 54 respectively. The information from the input data stream 64 is carried in the phase shift between the two beams 68 and 70. The beam 70 passes through another polarization scrambler 71 which is used to remove any polarization preference induced by the phase modulator 58 and to reduce possible magnetic coupling effects as discussed in Cahill, et al., U.S. Pat. No. 4,712,306. Polarization scramblers also can be positioned on both sides of the phase modulator 58. The two beams 68 and 70 travel about the remainder of the Sagnac loop 56 and combine at the central beamsplitter 44 into beam 72 which is transmitted on another arm 74 of the beamsplitter 44 to a detector 76.

When the two light beams 68 and 70 have circulated about the Sagnac loop 56 and have returned to the central fiber optic beamsplitter 44, they interfere with each other. If the two beams 70 and 68 are in phase, they recombine on the central beamsplitter 44 and all of the light is directed toward the light source 36. If the two light beams 68 and 70 are 180° out of phase, all of the light in the beams 68 and 70 is directed toward the output detector 76. In this way, the phase modulated input to the counter propagating light beams 68 and 70 is converted into amplitude modulations in the light beam 72 that falls on the detector 76. It should be noted that a small amount of amplitude modulated light could be reflected back into the system 30 compromising security. To avoid this, the ends 80 and 82 of the fiber arms 42 and 74 terminating at the light source 36 and detector 76 can be configured to minimize back reflections using such techniques as anti reflection coatings or angled surfaces. Alternatively, the two lengths of fiber in the arms 42 and 74 can be approximately matched. The criteria for effective matching is that the mismatch should have an optical delay that is small compared to the inverse characteristic transmission frequency. As an example, if the system 30 is transmitting at 100 megabytes per second rate, each byte has an effective optical path length through the fiber of about two meters. Any mismatch in the two lengths of fiber in the arms 42 and 74, should not be more than a small fraction of this, i.e. 10 centimeters would be adequate for good signal suppression. Also, for this method of preventing nonsecure data transmissions to be effective, the ends 80 and 82 of the fibers 42 and 74 terminating at the light source 36 and the detector 76 should have approximately the same level of back reflection.

After the light beam 72 hits the detector 76, the detector 76 produces an electrical output 90 to a data reformatter 92 which reconstructs the output data stream 94 to match the input data stream 64.

Figure 2A:
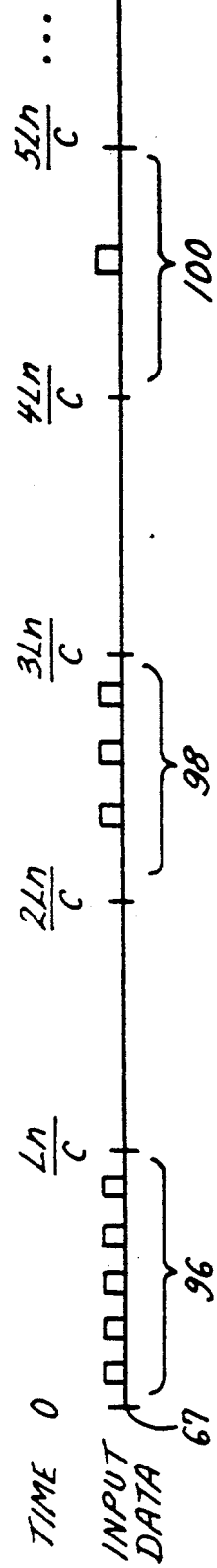
FIGS. 2A, 2B, 2C and 2D are timing diagrams illustrating the effect of bursting data onto the Sagnac interferometer system of FIG. 1 for high speed transmission.
Figure 2B:
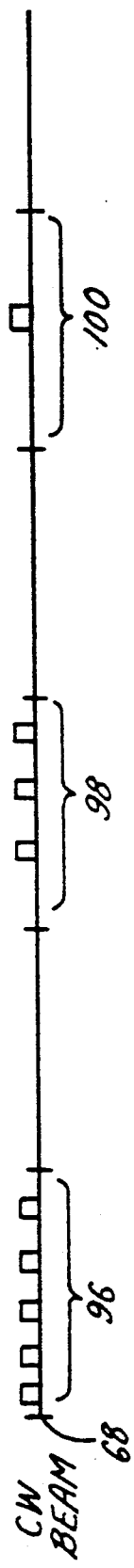
Figure 2C:
Figure 2D:
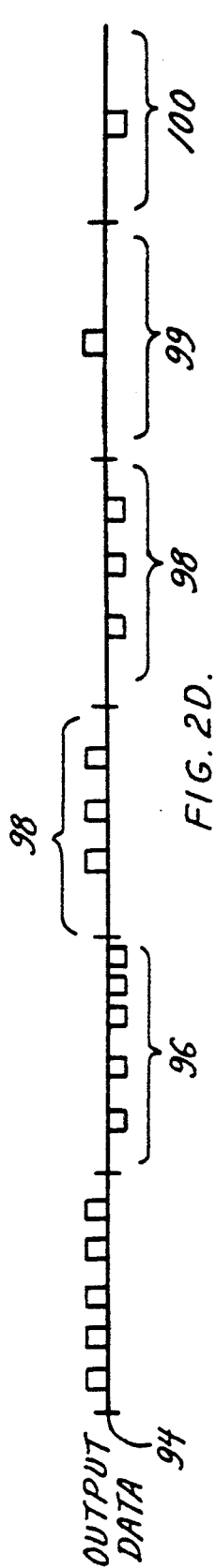

To enter the data stream 64 onto the Sagnac secure fiber optic communication system 30, a number of approaches may be employed. FIGS. 2A, 2B, 2C and 2D illustrate an approach based on "bursting" data onto the system 30. In this case, the input serial data stream 64 is divided into packets of data as shown in FIG. 2A by the data formatter 66 into input 67. The packets are arranged in length so that a packet 96 may be transmitted to the phase modulator 58 in a time that is less than Ln/c where L is twice the length 62 of fiber in the Sagnac loop 56 between the phase modulator 58 and its center 60 as is shown in FIG. 1, c is the speed of light in vacuum and n is the index of refraction of the optical fiber used in the loop 56. Note that for the system 30 to operate, the phase modulator 58 must be offset from the center 60 of the Sagnac loop 56. Otherwise L equals zero and there is no time slot to enter data. Since both counter propagating beams 52 and 54 pass through the phase modulator 58 simultaneously, the data is entered onto both light beams 68 and 70 in phase. Thus, referring again to FIG. 2A, the "bursting" data method involves entering the first data burst packet 96 within a time interval of less than Ln/c, like from O to Ln/c, and then turning off the phase modulator 58 during the next time interval from Ln/c to $$2\frac{Ln}{c},$$

entering a second packet 98 during the time interval $$2\frac{Ln}{c} \text{ to } 3\frac{Ln}{c},$$

turning the modulator 58 off during the time interval $$3\frac{Ln}{c} \text{ to } 4\frac{Ln}{c},$$

entering a third packet 100, during time interval $$4\frac{Ln}{c} \text{ to } 5\frac{Ln}{c}$$

and so forth. The clockwise (cw) and counterclockwise (ccw) modulated light beams 68 and arrive at the central fiber beamsplitter 44 at times differing by Ln/c after passage through the phase modulator 58. FIGS. 2B and 2C illustrate the beams 68 and 70 as being offset by this time interval. As a result of the time difference, when the two beams 68 and 70 recombine on the central fiber optic beamsplitter 44, the resultant output data is repeated twice, as shown in FIG. 2D. The two data "bursts" are also 180° out of phase with respect to each other because the phase data is carried first by one beam 68 and then by the other 70. The action of the output data formatter 92 for burst data formatting is to strip off one or the other of the bursts and reconvert it to a serial output data stream. There are disadvantages associated with this data formatting technique in that the phase modulator 58 has to operate at least twice the speed of the input data stream in order to put the data on the loop 56, and the number of bits that can be configured into a burst depends on the length of the offset length L. The "bursting" data technique does have the advantage of allowing very high data rates since integrated optic modulators are commercially available that operate at 3 GBPS and have been demonstrated in laboratories to over 25 GBPS. Using the burst method allows throughput speeds to approach 12.5 GBPS limited by any extra length of the offset coil required for ease of set up. Another potential advantage of this approach is that since each "burst" is sent twice, the other copy 102 of the data can be fed to error checking circuitry 104 which compares the two data stream 94 and 102 for enhanced performance before producing a final output 106 and/or an alarm signal 108.

It is also possible to configure the formatting and deformatting of the Sagnac secure fiber optic communication system 30 for continuous data transmission. This can be done by using the intrinsic differentiation characteristics of the Sagnac interferometer. Specifically, input square wave data can be integrated into a sawtooth waveform similar to that shown in FIG. 3A. After each cycle period there, the integrator is reset to zero to limit the required dynamic range of the drive circuitry. Provided the offset time Ln/c is small compared to the characteristic cycle time of the data stream, the action of the Sagnac interferometer will be to differentiate the waveform and reconstruct the square wave on the output detector 76. There is a trade off here. Letting the offset time approach the characteristic data cycle time results in a larger amplitude signal at the cost of less sharpness in the rise and fall time of the output data. Spikes resulting from the sharp rise and fall off of the output data may be gated or filtered out. It is also possible to configure the data formatter 66 with other sawtooth waveforms, such as those shown in FIGS. 3B and 3C that result in square wave outputs. In principle any waveform could be integrated and then reconstructed by differentiation in the Sagnac secure fiber optic communication system 30. Such a system 30 could have real-time analog signal transmission capabilities without electronic conversion into and out of digital format.

The basic system 30 shown in FIG. 1 has several secure features built in. Since the light source 36 is on continuously, an intruder tapping light from the system 30 will see what looks like a defective link. Since the information is carried in phase rather than amplitude, the signal is riding on the frequency of the light beam. This then implies that the intruder must build an interferometer to beat down the carrier frequency to detectable levels. There are several methods to make this increasingly difficult for the intruder that are discussed in association with the following embodiments.

Protective features that can be readily built into the basic system 30 include the usage of a low coherence light source such as a light emitting diode or fiber laser, which creates a substantial pathlength matching problem when the intruder tries to build an interferometric tap using the system light source. Further complicating matters are environmental effects, which to first order are canceled out for the Sagnac secure fiber optic communication system 30 but can couple directly into some prospective interferometric taps. It is also possible to configure the loop 56 so that its two legs 110 and 112 are not collocated, that is they can be run on different sides of a canyon or in cables in different parts of a city. A third readily achievable security feature of the basic system 30 involves monitoring the data for throughput errors and shutting the system 30 down automatically if the error rate becomes to high. A fourth readily achievable security feature of the basic system 30 involves shutting the light source 36 down, and using the detector 76 to see if someone is injecting light into the system 30.

While the security features of the basic system 30 are substantial, the Sagnac loop type of secure fiber optic communication systems are readily amenable to the integration of features that can substantially enhance security. The modified system 120 of FIG. 4 illustrates the usage of a random pathlength generator 122 that has been placed near the center 60 of the Sagnac loop 56. Since both counter propagating light beams 52 and 70 pass through the random pathlength generator 122 nearly simultaneously, the data flow is interrupted only for the period of time it takes light to pass through any offset of the random pathlength generator 122 from the center 60 of the loop 56. If data flow can be turned off for a sufficient time, the random pathlength generator 122 can be placed anywhere in the loop 56. However the preferred position is at the center 60. A typical device to produce random pathlengths is a piezoelectric cylinder 124 having multiple turns 126 of optical fiber wrapped thereabout such as is shown in U.S. Pat. No. 4,002,896 to Davies et al. Application of different voltages to the cylinder 124 from a pathlength control 127 changes the diameter of the piezoelectric cylinder 124 and the length of the fiber in the turns 126. The pathlength control 127 may reset the random pathlength periodically. As an example, for the burst data formatting scenario discussed above, the random pathlength generator 122 can be reset between bursts through communication between the data formatter 66 and the pathlength control 127. Optical switches 128 also can be used to add or subtract matched pathlengths (shown as fiber coils 129) on opposite sides of the center 60 or in place of the random pathlength generator 122. While the changes easily can be arranged to have little or no effect on the performance of the Sagnac secure fiber optic communication system 120, they have a devastating effect on certain types of intruder taps.

Figure 5:
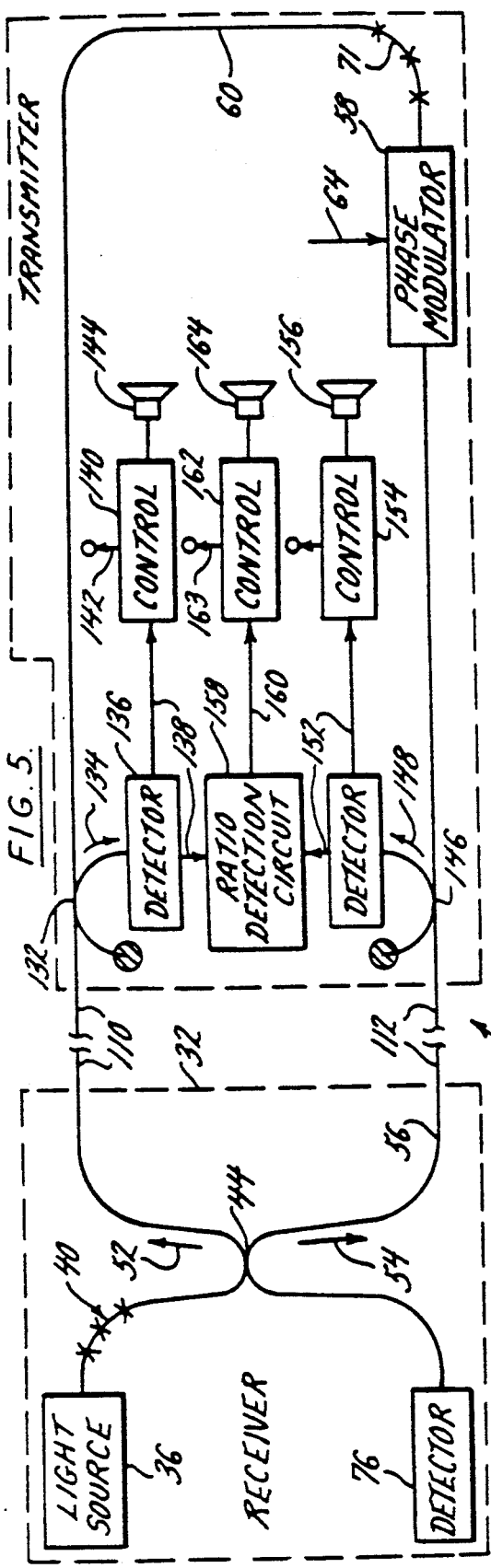
FIG. 5 is a schematic diagram of the Sagnac secure communication system of FIG. 1, modified to have dual alarm taps placed in front of the phase modulator to monitor light levels in the Sagnac loop and enhance security.

Another approach to enhancing security is to add detectors that monitor the light propagating through the Sagnac loop 56. If the light level goes up or down beyond preset tolerances, the system can be shut down and alarms triggered. FIG. 5 illustrates a Sagnac secure fiber optic communication system 130 that employs a dual tap alarm circuit. In system 130, a portion of the clockwise propagating light beam 52 is split off by a fiber beamsplitter 132 into the light beam 134. Depending on the construction of the fiber beamsplitter 132, the amount of power in the light beam 134 can range from a few percent to a substantial fraction of the power in light beam 52. The light beam 134 is directed to a detector 136, which in turn puts out a signal 138 proportional to the intensity of the light beam 134. If the signal 138 goes over or under preset limits, a control 140 produces a signal 142 to shut down the system 130 and/or activates an alarm 144. A beamsplitter 146 splits off a portion of the light beam 54 into the light beam 148 in a similar manner. The resulting light beam 148 is monitored by the detector 150 which in turn puts out a signal 152 to control 154 that must fall between preset limits or the control 154 shuts the system 130 down and/or activates an alarm 156. Since both light beams 52 and 54 are being monitored, it is also possible to monitor the ratio of the light intensities circulating through the fiber loop 56. Specifically the outputs 138 and 152 from the detectors 136 and 150 respectively can be fed into a ratio detection circuit 158 whose output 160 is monitored by a control 162 to fall within predetermined limits or the control 162 shuts down the system 130 via signal 163 and/or activates an alarm 164.

Figure 6:
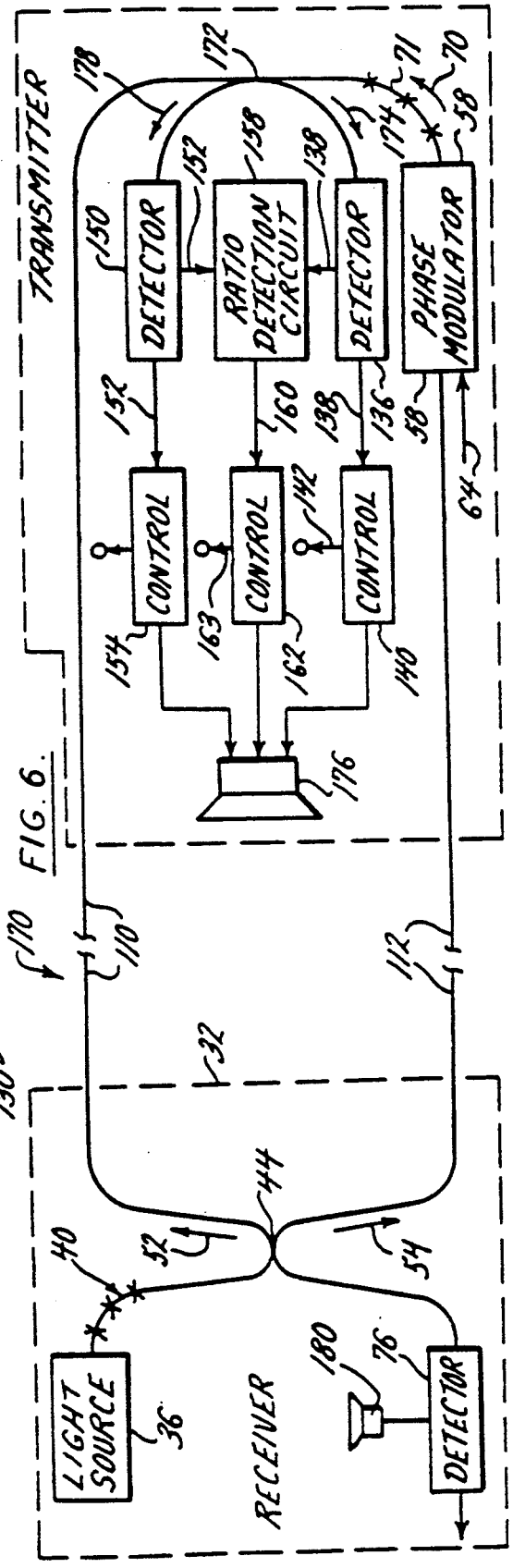
FIG. 6 is a schematic diagram of the Sagnac secure communication system of FIG. 1, modified to have a single tap alarm system with light level ratio detection to enhance security.

FIG. 6 illustrates a basic Sagnac secure fiber optic communication system 170 with an alarm based on a single tap. In system 170, a single fiber beamsplitter 172 is used to tap off a portion of the light beams 52 and 70. The portion of the light beam 52 that is tapped, light beam 174, is directed toward the alarm detector 136. The detector 136 then puts out the signal 138 that is proportional to the intensity of the light beam 174. If the signal 138 is greater or less than the preset limits, the system 170 is shut down by signal 142 from the control 140 and/or the alarm 176 is triggered. Similarly a portion of the light beam 70 is tapped by the fiber beamsplitter 172, and fed as light beam 178 toward the alarm detector 150 which in turn generates the signal 152 that is proportional to the intensity of the light beam 178. If the signal 152 falls outside the predetermined limits, the control 154 produces a signal to shut down the system 170 and/or cause alarm 176 to be triggered. The signal outputs 138 and 152 from the detectors 136 and 150 respectively, are also directed toward the ratio detection circuit 158. As before, the ratio circuit 158 generates the ratio signal 160 that is monitored by the control 162. If the ratio signal 160 falls outside the predetermined limits, the control 162 causes the system 170 to shut down and/or the alarm 176 to be triggered.

The alarmed systems 130 and 170 that have been described in association with FIGS. 5 and 6 are intended to increase the difficulty of an intruder performing an unauthorized tap that allows interception of data and goes undetected. The dual tap configuration of FIG. 5 has the advantage of being independent of loss variations that may occur due to the phase modulator 58 and any other elements in the Sagnac loop 56 behind the tap points. The disadvantage is that this approach relies on two separate taps 132 and 146. The configuration of FIG. 6 has the advantage of relying on a single tap 172. The disadvantage is that this alarm approach is subject to amplitude variations in the throughput of the phase modulator 58. In 1992, the state of the art is such that the dual tap approach appears to offer superior performance by enabling tighter tolerances to be held, however as technology continues to improve, the single tap approach may be preferred.

If an alarm is triggered by exceeding or dropping below the predetermined limits, the system 130 or 170 may be shut down in a number of ways. One of the simplest is to simply turn off the phase modulator 58 by switching off the data input 64. Other methods can include entering a predetermined warning signal into the phase modulator 58 that can be used to alert the receiver portion 32 and trigger an alarm 180 there.

Figure 7:
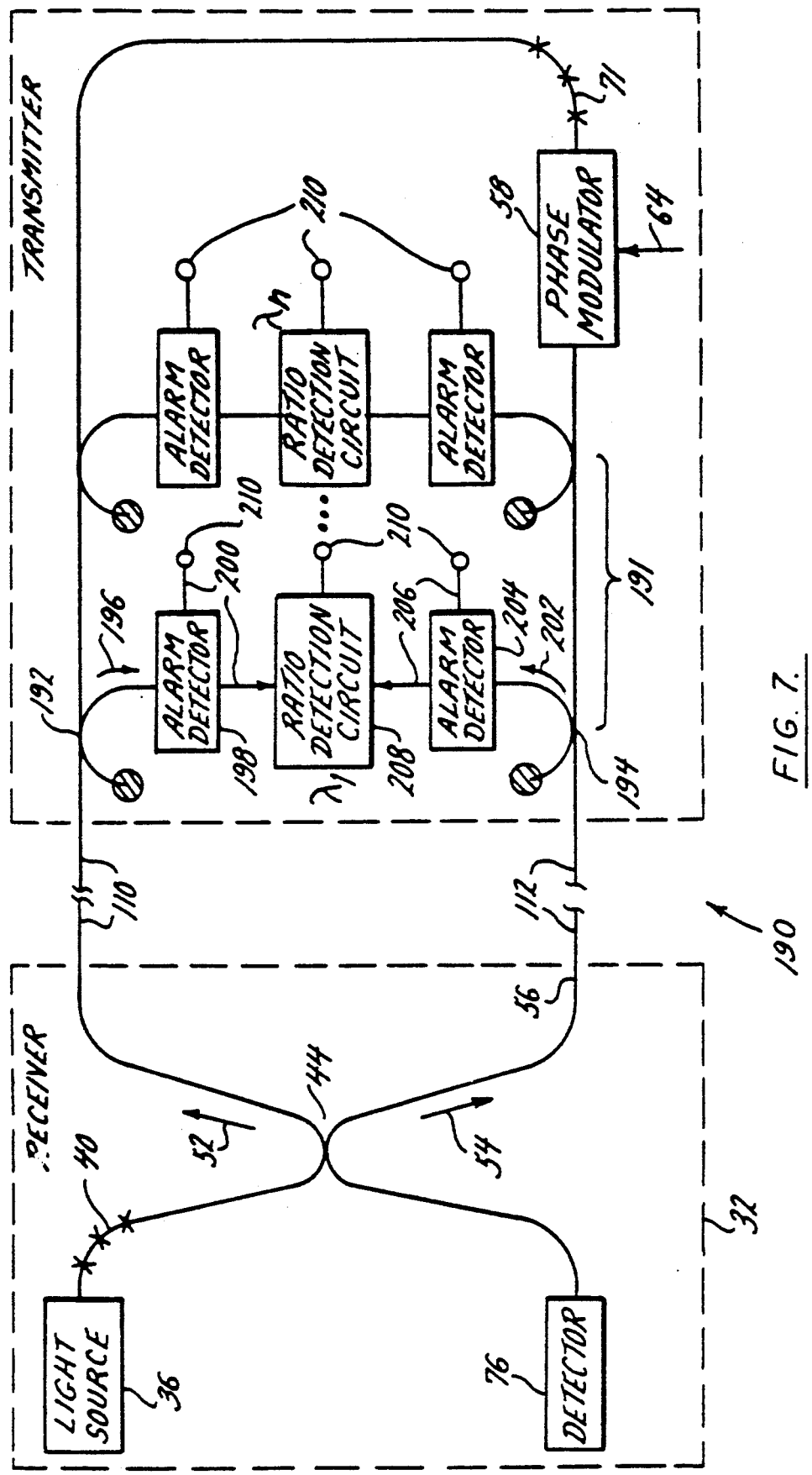
FIG. 7 is a schematic diagram of the Sagnac secure communication system of FIG. 1, modified to have a series of spectral taps to monitor portions of the light source spectrum circulating in the Sagnac loop for improved security.

The intruder and alarm devices described in association with FIGS. 5 and 6 involve taps that have a very broad spectral range to protect against intrusions that inject light into the system 170. Another approach, illustrated by FIG. 7, is to employ a system 190 with alarm means 191 that monitor the wavelength regions that could represent a threat to security, by breaking the alarm means 191 up into spectral bands. This approach has a number of advantages including optimizing detector response for the spectral band of interest, allowing dark regions, where the light source 36 does not emit optical power, to be monitored with very high sensitivity, and improving sensitivity to changes in the spectral profile in the emission band of the light source 36, which could be caused by an intruder injecting light to try to defeat the sensing of light loss due to an unauthorized tap. The disadvantage of such enhanced protection is additional complexity and cost associated with multiple alarm systems each designed to cover certain regions of the spectrum of interest. Referring to FIG. 7, the alarm means 191 having a series of dual tap alarms configured in a manner similar to that described in association with system 130 of FIG. 5, are shown. In the system 190 however, each set of dual taps is assigned a specific spectral region. In particular, the taps 192 and 194 are designed to operate over a wavelength band centered about wavelength $\lambda_1$. The light beam 196 tapped by the tap 192 is directed toward the alarm detector 198, which in turn generates a signal 200 proportional to the intensity of the light beam 196. As in system 130, if the signal 200 is outside predetermined limits, the system 190 shuts down and/or an alarm is triggered. Similarly, the light beam 202 that is generated by the tap 194 is directed toward alarm detector 204. The detector 204 in turn generates a signal 206 that is proportional to the intensity of the light beam 202. If the signal 206 falls outside of predetermined limits, the system 190 shuts down and/or an alarm is activated. The output signals 200 and 206 from the detectors 198 and 204 also can be fed into ratio circuitry 208 which outputs the alarm signal 210. As in system 130, if the signal 210 falls outside predetermined limits, the system 190 shuts down and/or an alarm is triggered. Similar dual tap alarms are set up to operate over wavelength bands centered about wavelength $\lambda_2$, wavelength $\lambda_3$, . . . up to wavelength $\lambda_n$, the dual tap alarm 210 for wavelength $\lambda_n$ being shown. In exactly analogous fashion, a similar multispectral ratio alarm system can be set up using single tap configurations like those employed in association with system 170 of FIG. 6.

Figure 8:
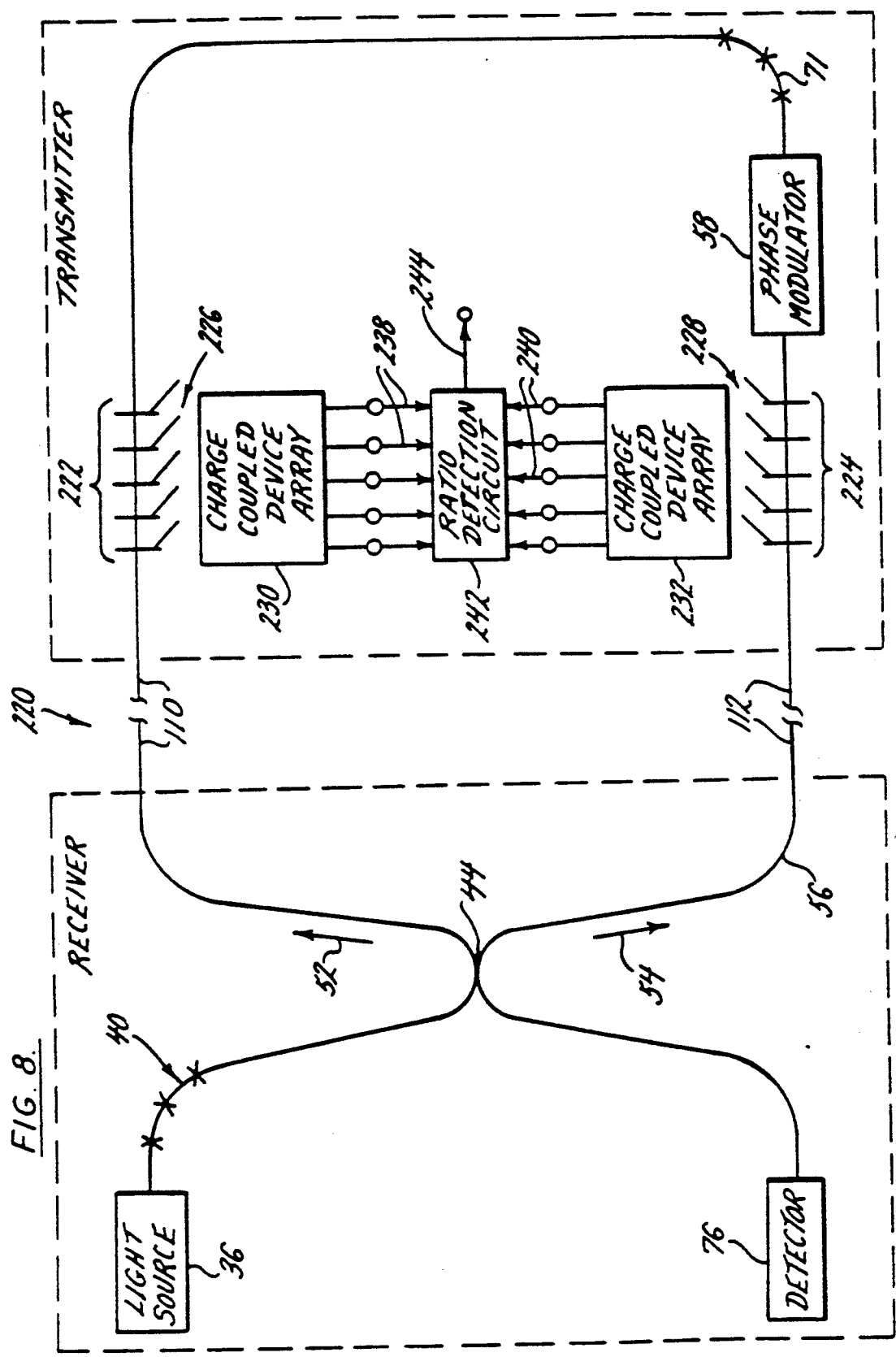
FIG. 8 is a schematic diagram of the Sagnac secure communication system of FIG. 1, modified to have a dispersive tap in combination with a charge coupled device array to monitor the spectral content of the light circulating through the Sagnac loop.

Another way to implement a broad spectral range alarm system 220 is shown in FIG. 8. Here both counter propagating light beams 52 and 54 in the Sagnac secure fiber optic communication system 220 are tapped by the dispersive taps 222 and 224. These taps 222 and 224 could be fiber gratings, combinations of fiber beamsplitters and conventional dispersive elements (such as holographic gratings and prisms), or other dispersive components. The dispersed light beams 226 and 228 are then imaged onto charge coupled device (CCD) arrays 230 and 232 comprised of a large number of in-line detectors. The output signals 238 and 240 from the arrays 230 and 232 can then be monitored and checked against predetermined limits as in systems 130 and 190. If these limits are exceeded, the system 220 can be shut down and/or an alarm triggered. The output signals 238 and 240 also can be fed into a ratio circuit 242 whose output signal 244 is checked against predetermined limits. If the limits are exceeded, the system 220 is shut down and/or an alarm is triggered to preserve security. The advantage of the security alarm approach of system 220 is that any intrusion attempt that changes the spectral profile circulating through the Sagnac loop 56, can be detected rapidly.

It should be noted that conventional communications fiber, used to support these Sagnac secure fiber optic communication systems, in general has a specific spectral passband with relatively low attenuation and the action of the fiber itself will tend to filter and strongly attenuate wavelengths outside of its passband. It is also possible to add filtering to the Sagnac loop 56, preferably adjacent to the phase modulator 58, which will assure that the alarms of FIGS. 5 through 8 and similar alarm systems have sufficient spectral coverage to secure the communication system against threats.

Figure 9:
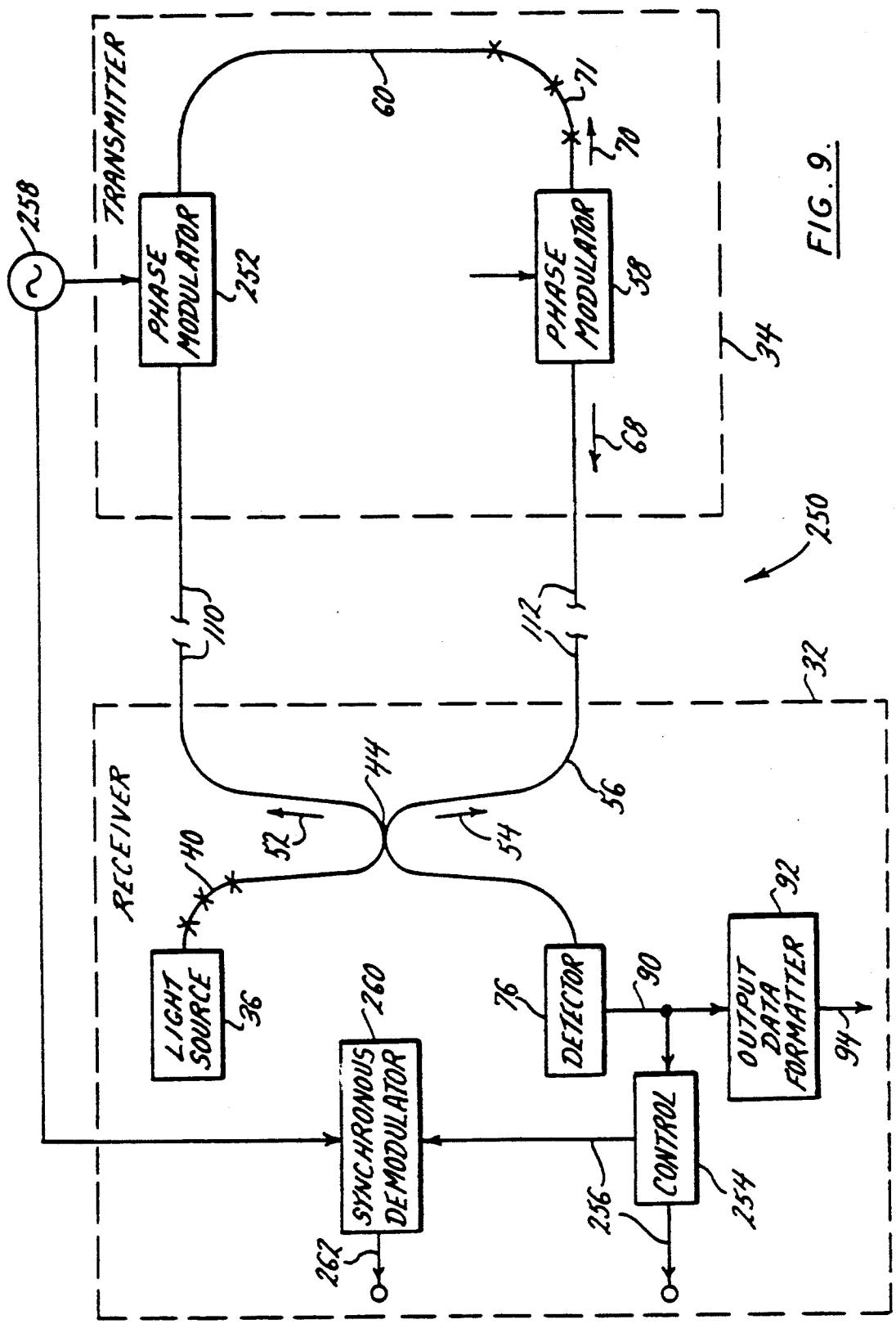
FIG. 9 is a schematic diagram of the Sagnac secure communication system of FIG. 1, modified to have a coherent alarm system to enhance security.

A different approach to prevent intrusion of a Sagnac secure fiber optic communication system with alarms is to provide a system 250 with coherent alarm means such as that shown in FIG. 9. In system 250, the technique is to monitor the phase information impressed on the counter propagating light beams 52 and 54 by the phase modulator 58 or alternatively another separate phase modulator 252 placed in the Sagnac loop 56 for this purpose. If the expected signal level of the coherently mixed light beams 68 and 70 changes beyond predetermined limits as detected on the output detector 76, then the system 250 is shut down and/or an alarm triggered. The output from the detector 76 is routed to the data reformatter 92 and also to the signal measurement alarm control 254. The signal measurement alarm control 254 determines whether or not the predetermined limits have been exceeded, its output 256 being used to shut down the system 250 and/or trigger an alarm.

There are a number of ways the alarm control 254 may be implemented. One method is to simply look at the data itself and make measurements of peak-to-peak signal level or bit error rate. Another method is to put a relatively low frequency signal, which could be sinusoidal, onto the phase modulator 58 and superpose it with the data carrying signal or impress it with the separate phase modulator 252. This low frequency signal can then be filtered out in the control 254 and monitored to serve as the alarm signal. While the modulator 252 is shown placed in the transmitter portion 34, it can be placed anywhere that is sufficiently offset from the center 60 of the Sagnac loop 56. In particular, it could be placed in the receiver portion 32. The phase modulator 252 can be driven by an oscillator 258 at a low fixed frequency that can also be used to support a synchronous demodulator 260 used to monitor changes in the level of the output 256. This synchronous demodulator 260 can be used to monitor the total power in the first few harmonics of the phase modulator coherent alarm signal drive frequency to produce an alarm signal 262.

Figure 10:
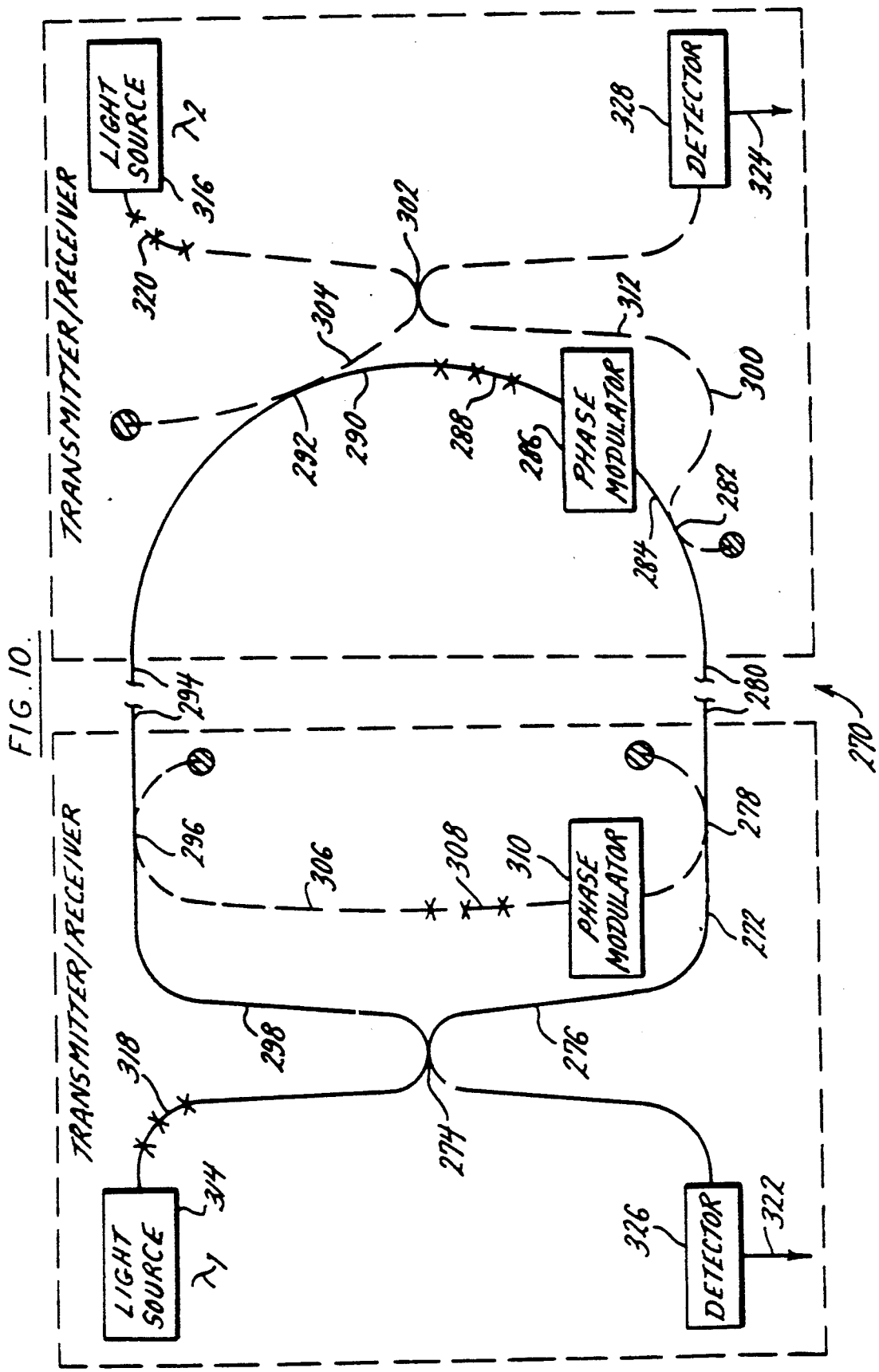
FIG. 10 is a schematic diagram of a wavelength division multiplexed form of the present Sagnac secure communication system that allows full duplex operation over two optical fibers.

For a full duplex Sagnac secure fiber optic communication system as described above, an essentially duplicate system facing the opposite direction and using an additional pair of fibers is necessary. If wavelength division multiplexing techniques are used as shown with system 270 of FIG. 10, only two optical fibers are needed. Here one Sagnac loop 272 is comprised of central beamsplitter 274, fiber 276, beamsplitter 278, common fiber 280, beamsplitter 282, fiber 284, phase modulator 286, depolarizer 288, fiber 290, beamsplitter 292, common fiber 294, beamsplitter 296, and fiber 298. The other Sagnac loop 300 includes central beamsplitter 302, fiber 304, beamsplitter 292, common fiber 294, beamsplitter 296, fiber 306, depolarizer 308, phase modulator 310, fiber 312, beamsplitter 278, common fiber 280, beamsplitter 282, and fiber 312. The first Sagnac loop 272 is operated at wavelength $\lambda_1$, which could be 1.3 microns, while the second Sagnac loop 300 is operated at wavelength $\lambda_2$, which could be 1.5 microns. The beamsplitters 278, 282, 292, and 296 are of the wavelength division multiplexing type and are used to spectrally separate the two Sagnac loops 272 and 300 so that the loops 272 and 300 operate independently. As an example, if wavelength $\lambda_1$ is 1.3 microns and wavelength $\lambda_2$ is 1.5 microns, then the wavelength division multiplexing elements could be fiber beamsplitters designed so that light at 1.3 microns passes straight through without cross-coupling while light at 1.5 microns is nearly completely cross-coupled. Thus only one type of wavelength division multiplexing beamsplitter is needed for beamsplitters 278, 282, 292 and 296. The system 270, which can be constructed like two of the systems 130, 170, 190 or 220, has light sources 314 and 316 producing light with a center frequency of $\lambda_1$ and $\lambda_2$ respectively. Each provides light, whose polarization is scrambled by depolarizers 318 and 320 to the central beamsplitters 274 and 302 respectively. On return, after mixing on the central beamsplitter 274 and 302, the light is converted into electrical output signals 322 and 324 by detectors 326 and 328 respectively.

Figure 11:
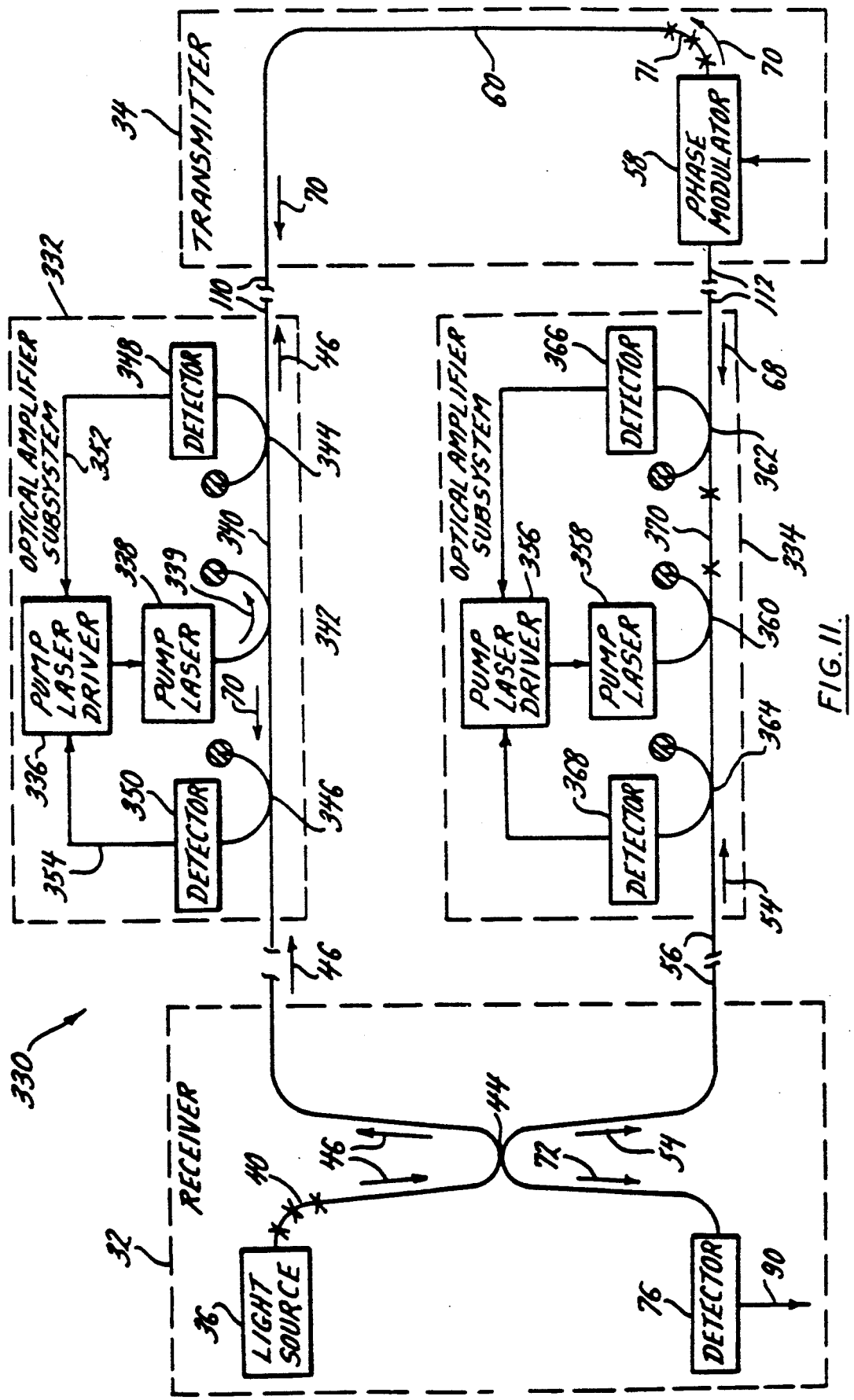
FIG. 11 is a schematic diagram of a Sagnac secure communication system using in-line optical amplifiers to extend its communication distance without requiring secure repeaters.

The current state of available commercial components is such that it is possible to operate the above-described Sagnac secure fiber optic communication systems for distances of approximately 50 km without a repeater. With the development of fiber amplifiers, it is possible to consider much longer links using all optical repeaters that preserve security. Such a system 330, which is system 30 of FIG. 1 modified for long distance communications, is shown in FIG. 11. Here all optical amplifier subsystems 332 and 334 are placed between the transmitter portion 34 and receiver portion 32. The subsystems 332 and 334 are secure because they amplify in the optical regime without extracting any data. The amplifier system 332 in leg 110 includes a pump laser driver 336 that supplies the drive current to a pump laser 338. The light 339 from the pump laser 338 is then coupled into the fiber amplifier 340 via a wavelength division multiplexing element 342. The fiber amplifier 340 increases the power in the counter propagating light beams 46 and 70. The power in the counter propagating light beams 46 and 70 after passage through the fiber amplifier 340 is monitored by the fiber taps 344 and 346 in combination with the detectors 348 and 350, respectively. The outputs 352 and 346 of the detectors 348 and 350 are fed into the pump laser driver 336 and are used to stabilize the action of the fiber amplifier 340 by controlling the output power of the pump laser 338. The pump laser driver 356, pump laser 358, multiplexing element 360, taps 362 and 364, and detectors 366 and 368 of subsystem 334, support the amplifier 370 in leg 112, which operates to boost the power in counter propagating beams 54 and 68. It is possible to run the Sagnac loop 56 with one amplifier instead of dual amplifiers. However dual amplifiers may improve overall performance of the system 330 especially if the same pump laser is used to drive matched sets of amplifiers in both legs 110 and 112 of the Sagnac loop 56. For wavelength division multiplexed links such as system 380 shown in FIG. 10, two pairs of amplifiers to cover each wavelength band may be necessary.

Figure 12A:
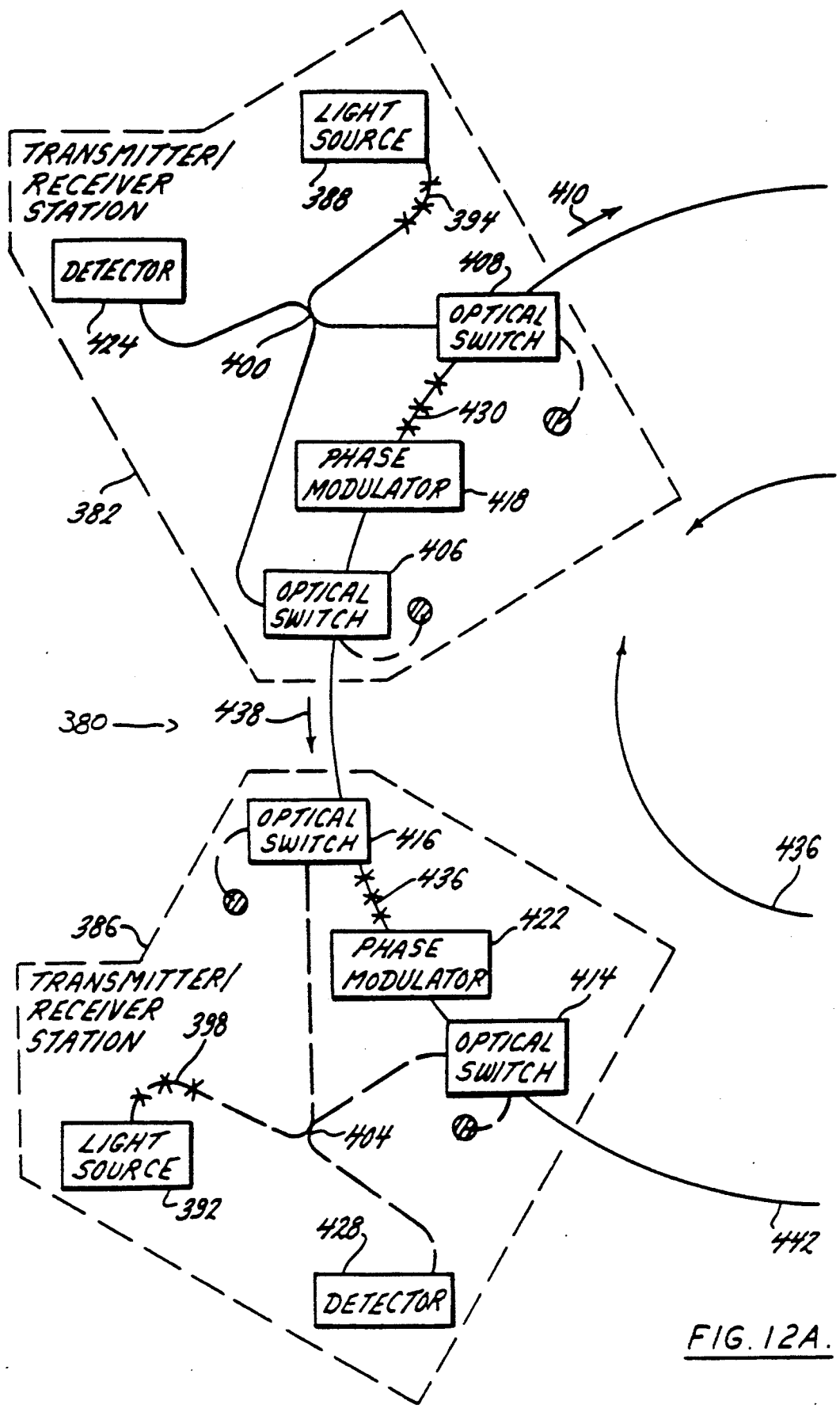
FIGS. 12A and 12B are a schematic diagram of a Sagnac secure fiber optic communication network supported on a single optical fiber loop.
Figure 12B:
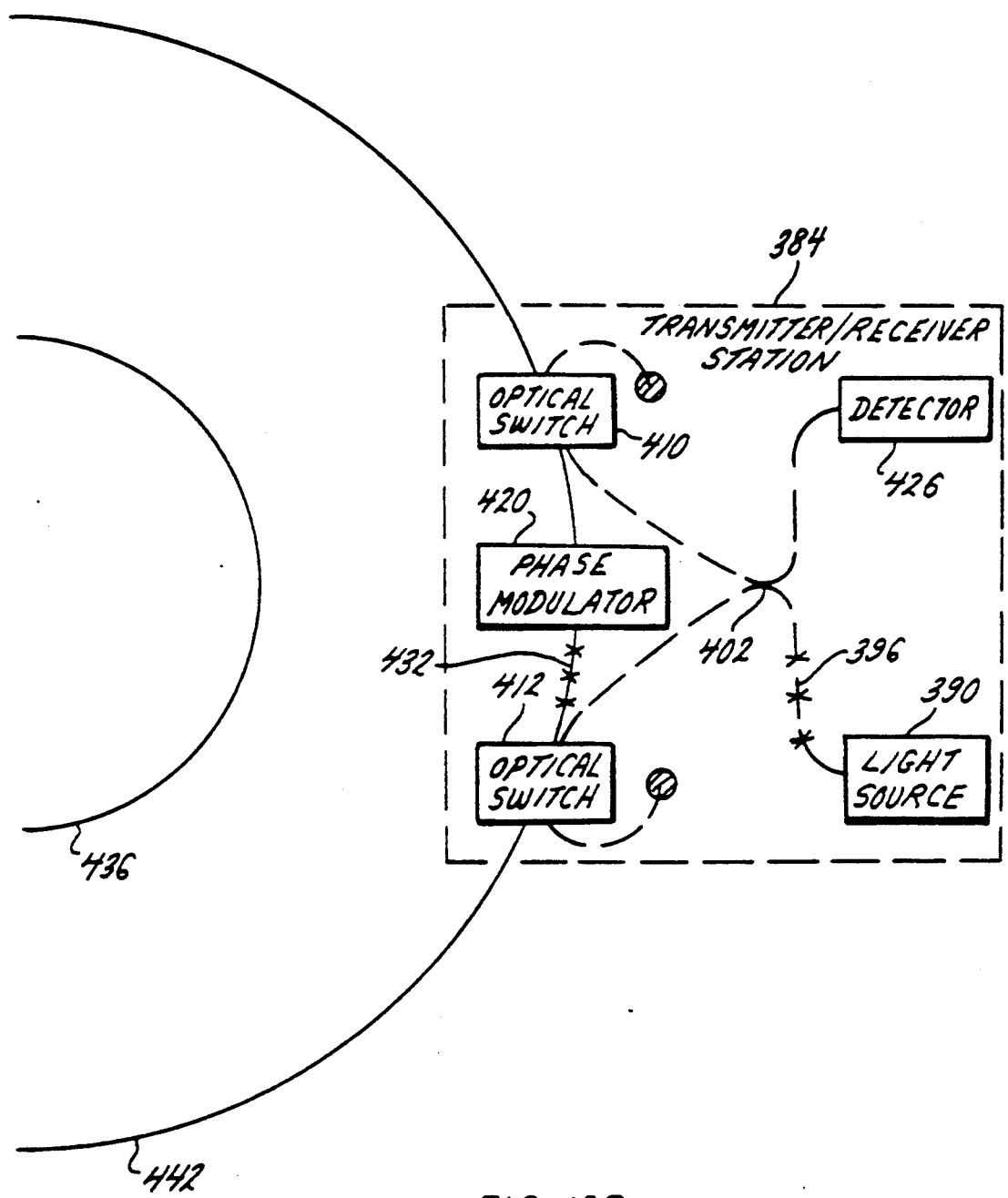

It is also possible to extend a Sagnac secure fiber optic communication system into a network supported by a single optical fiber interconnection loop. This system 380, which is illustrated for the case of three network nodes in FIGS. 12A and 12B, includes three similar transmitter/receiver stations 382, 384 and 386. Each station 382, 384 or 386 includes: a light source 388, 390, or 392; fiber scrambler 394, 396 or 398; a central beamsplitter 400, 402 or 404; optical switches 406 and 408, 410 and 412, or 414 and 416; a phase modulator 418, 420 or 422; an output detector 424, 426, or 428; and a loop polarization scrambler 430, 432 or 434, respectively. As an illustration of the operation of this network system 380, FIGS. 12A and 12B are drawn to show the operational configuration where a Sagnac loop 436 extending from transmitter/receiver station 382 is operational. In this configuration, the fiber path for the counter propagating light beams 438 and 440 through the Sagnac loop 436 is drawn with heavy lines and the paths that have been cut off by the optical switches 406, 408, 410, 412, 414, and 416 are shown in dashed line. Note that in this configuration, station 384 and station 386 can transmit to station 382 securely via their phase modulators 420 and 422. When station 382 is to transmit securely, its switches 406 and 408 are switched so that its phase modulator 418 is in the loop 436 and either station 384 of 386 can listen securely by configuring its switches, 410 and 412, or 414 and 416 so that its light source 390 or 392, detector 426 or 428, and central beamsplitter 402 or 404 are in the loop 436 and its phase modulator 420 or 422 is disconnected. Note that only one station can listen at one time but the other two can transmit so long as means are provided to separate their transmissions at the receiver. The phase modulators 420 or 422 cannot be positioned at the exact center 442 of the loop 436 from the central beamsplitter 400 if they are to communicate with station 382. However, by noting the relative time positions of the received data pulses, the receiving station can identify the location of the sender. In this manner the network system 380 can achieve high levels of data security and integrity.

There are many different ways network protocol can be handled. Examples include having each station operate in a given time slot or using a token passing scheme where the token is be passed via a non-secure signal that is wavelength division multiplexed along the loop 436.

The above examples have illustrated how Sagnac interferometer based secure fiber optic communication systems may be implemented and alarms that sense an intrusion added for improved security. Examples have also been given of how such basic systems may be configured into full duplex and networked systems. However, in some cases, it is also desirable to know the location of a potential intruder. It is possible to do this using a wavelength division multiplexed Sagnac distributed sensing approach described below.

In 1987, Dakin (Proceedings of SPIE, Vol. 838, p. 325, 1987) described a distributed fiber optic sensor based on the combination of a Sagnac and Mach-Zehnder interferometer. A Sagnac sensor can be arranged to have a position dependent response as described in R. F. Cahill and E. Udd, U.S. Pat. No. 4,375,680, Mar. 1, 1983 and in E. Udd, *Fiber-Optic Acoustic Sensor Based on the Sagnac Interferometer*, Proceedings of SPIE, Vol. 425, p. 90, 1983. By combining the output of the Sagnac interferometer response to a frequency dependent environmental effect along with the direct response of a Mach-Zehnder interferometer (see A. Dandridge, *The Mach-Zehnder and Michelson Interferometer* in Fiber Optic Sensors: An Introduction for Engineers and Scientists, edited by E. Udd, Wiley 1991) and normalizing the result, the position and location of a frequency dependent environmental effect can be determined.

One of the major issues associated with the approach proposed by Dakin is that the requirements on the light source for optimum performance of Mach-Zehnder and Sagnac interferometers are diametrically opposed. Specifically a high performance Mach-Zehnder interferometer uses a long coherence length light source that is often very susceptible to feedback while the Sagnac interferometer performs best with a low coherence length light source. While it is possible to reduce the problems by redesigning the Dakin distributed sensor using wavelength division multiplexing techniques and isolators, it is also possible to design a distributed sensor based on solely the Sagnac interferometer described by E. Udd in U.S. Pat. Nos. 4,898,468, 4,976,507 and 5,046,848. The approach described here uses dual Sagnac interferometers operating in conjunction with one another on separate distinct wavelengths to form a distributed sensor. This particular approach is very well suited to the formation of alarms to supplement the Sagnac secure fiber optic communication systems described previously as well as securing ordinary fiber optic communication lines.

A basic wavelength division multiplexed Sagnac distributed sensor 494 having two sensors 496 and 498 protecting the same length run 500 of optical fibers is shown in FIG. 13A. Light from a light source 501 operating at a center wavelength $\lambda_1$ is coupled to the fiber end 503 to form the light beam 505. The light source 501 may be a spectrally broadband light source such as a light emitting diode. After the light beam 505 enters the fiber end 503, it passes through a polarization scrambler 507 that acts to distribute the spectral power of the light beam 505 over many polarization states. The polarization scrambled light beam 508 then enters a central beamsplitter 509 where it is split into a clockwise propagating light beam 511 and a counterclockwise propagating light beam 513. The clockwise light beam 511 then circulates about the Sagnac loop 514, passing wavelength division multiplexing elements 515 and 517 that are designed to pass the wavelength $\lambda_1$ straight through the polarization scrambler 519 that reduces magnetically induced noise effects in the Sagnac loop 514 and the wavelength division multiplexing elements 521 and 523 that are also designed to pass the wavelength $\lambda_1$ straight through before returning to the coupler 509. The counterclockwise beam of light 513 traverses the same elements in the opposite order to return to the coupler 509 after circulating around the Sagnac loop 514. The clockwise light beam 511 and the counterclockwise light beam 513 then interfere with each other at the central beamsplitter 509. If the light beams 511 and 513 are in phase with one another, all the light is directed toward the light source 501. If the light beams 511 and 513 are 180° out of phase, all the light is directed toward the detector 525.

When a frequency dependent environmental effect 527 acts on a section 528 of the fiber loop 514, it induces an optical path length modulation locally in the optical fiber 529 at that section 528. The amplitude of the resulting oscillation depends on the strength of the environmental effect and the response of the fiber 529 to it. The response of the Sagnac sensor 496 to the environmentally induced oscillation depends on the position of the frequency dependent environmental effect 527 on the Sagnac loop 514 of sensor 496. If the effect 527 occurs near the center of the Sagnac loop 514, both the clockwise light beam 511 and the counterclockwise light beam 513 arrive nearly simultaneously at the beamsplitter 509 and the induced phase difference between the two beams may be very close to zero. As the frequency dependent environmental effect 527 moves toward the central beamsplitter 509, the difference in the time of arrival between the clockwise light beam 511 and counterclockwise propagating light beam 513 increases. As long as the frequency of the environmental signal 527 is small compared to the characteristic frequency of the Sagnac loop (c/Ln where c is the speed of light in vacuum, L is the length of the loop and n is the index of refraction of the fiber in the loop) the amplitude of the resultant signal on the detector 525 will increase linearly with the amplitude of the effect 527 and will decrease linearly as its position moves from the central beamsplitter 509 toward the center of the Sagnac loop 514.

For an environmental effect, fixed in amplitude and frequency, the position dependent response of sensor 496 is shown by the solid line on the graph of FIG. 13B for the upper fiber portion 529 of the Sagnac loop 514. The signal generated for the lower portion of the Sagnac loop 514 will be similar although the phase of the output will change by 180°.

The second Sagnac interferometer sensor 498 is set up to act in a similar manner. A light source 531 couples light at wavelength $\lambda_2$ into the fiber end 532 to form the light beam 533. Residual polarization preference of the beam 533 is removed by a polarization scrambler 535. The light beam 533 then is split by a central beamsplitter 537 into counter propagating light beams 539 and 541 for passage about the second Sagnac loop 542. The clockwise propagating light beam 539 is cross-coupled by the wavelength division multiplexing element 521 into the lower fiber portion 530. It is then cross-coupled by the wavelength division multiplexing element 523, passes through a polarization scrambler 545, is cross-coupled by the wavelength division multiplexing element 515 to the upper fiber portion 529 and is cross-coupled back toward the central beamsplitter 537 by the wavelength division multiplexing element 517. The counterclockwise propagating light beam 541 traverses the elements 517, 529, 515, 545, 523, 530 and 521 before returning to the central beamsplitter 537. The light beams 539 and 541 interfere upon returning to the central beamsplitter 537 and the resultant amplitude modulated signal is directed toward the a output detector 549.

The response of the upper fiber portion 529 of the Sagnac loop 542 of sensor 498 to an environmental effect, fixed in amplitude and frequency, with respect to position is shown in dashed line on the graph of FIG. 13B. The signal outputs 551 and 553 from the output detectors 525 and 549 respectively which result from the frequency dependent environmental effect 527, are fed into a signal processor 555. The sum of the two resultant signals is then used to form an amplitude output 557 of the frequency dependent environmental effect 527 and the ratio between outputs 551 and 553 is used to produce an output 559 indicative of the location of the frequency dependent environmental effect 527. In order to assure that the light sources 501 and 531 do not add excess noise to the system 494, they are stabilized by using drivers with feedback circuitry 561 and 563 to monitor the light beam 505 and 533 and adjust the drive currents to the sources 501 and 531.

To first order, the light beams 511 and 513, or 539 and 541 that counter propagate through the Sagnac loops 514 or 542 of the system 494 traverse nearly the same path and consequently are nearly in phase when they arrive at the central coupler 509 or 537. For low amplitude, low frequency signals this will result in the generation of signals that are primarily second and higher order even harmonics of the frequency of the environmental effect. This phenomenon is well known in association with work performed on fiber optic gyros, see for example, E. Udd, *Fiber Optic Sensors Based on the Sagnac Interferometer and Passive Ring Resonator*, in Fiber Optic Sensors: An Introduction for Engineers and Scientists, edited by E. Udd, Wiley, New York, 1991.

In order to extract low amplitude signals directly without demodulating higher harmonics, it is necessary to "bias" the Sagnac interferometer. This can be done by using a passive bias approach that employs a 3 by 3 (or higher order) coupler or a dynamic bias approach that places an oscillating phase modulator in the Sagnac loop. Both of these approaches can be used to implement a wavelength division multiplexed Sagnac distributed sensor that in turn may be used to support secure fiber optic communication systems.

Kjell Krakanes and Kjell Blotekjar (Optics Letters, Vol. 14, p. 1152, 1989) have demonstrated the ability to bias the Sagnac acoustic sensor system using a 3 by 3 coupler. Distributed Sagnac acoustic sensor 594 of FIG. 14 illustrates how 3 by 3 couplers can be substituted in the sensor 494 to implement a wavelength division multiplexed Sagnac sensor. Like sensor system 494, sensor system 594 has a pair of sensors 596 and 598 that sense from different directions over a common optical fiber run 600. A light source 601 that operates about a center wavelength $\lambda_1$ couples light into the fiber end 603. The resulting light beam 605 then passes through a polarization scrambler 607 that acts to depolarize the light beam 605. The light beam 605 then enters the 3 by 3 coupler 609 where it is split into three light beams, the clockwise propagating light beam 611, the counterclockwise propagating light beam 613 and the light beam 615. The light beam 615 propagates to the fiber end 617 which includes an optical termination 618 to avoid back reflection into the system 594, and is lost. As an example, the termination 618 may be constructed by crushing the fiber end 617 and covering it with index matching cement (see E. Udd and R. E. Wagoner, Method of Terminating an Optical Fiber, U.S. Pat. No. 4,834,493, May 30, 1989 for additional examples). The light beam 611 propagates about the Sagnac loop 619 of the sensor 596 through wavelength division multiplexing elements 620 and 621 and the polarization scrambler 623, returning to the 3 by 3 coupler 609 via wavelength division multiplexing elements 625 and 627. The counterclockwise propagating beam 613 circulates through the Sagnac loop 619 in the opposite direction through the elements 627, 625, 623, 621 and 620 before returning to the 3 by 3 coupler 609. When the two counter propagating light beams 611 and 613 return to the 3 by 3 coupler 609, they interfere with each other and depending upon their relative phase, will be directed toward a detector 629, a detector 631 or the light source 601 since 3 by 3 couplers with equal power splitting have the characteristic of shifting an input signal from output to output by 120° of phase. For a frequency dependent environmental signal 633 applied to the upper fiber leg 634 of the Sagnac loop 619, this will result in corresponding amplitude modulated signals 635, 636 and 637 being directed toward the detectors 629 and 631 and the light source 601 that are 120° out of phase with respect to each other (as opposed to 180° out of phase as is the case for a 2 by 2 coupler). The result is that the signals 635, 636 and 637 induced by the frequency dependent environmental effect 633 have significant first harmonic content when the outputs 638 and 639 from the detectors 629 and 631 are fed into the signal processor 640.

The situation for the Sagnac interferometer sensor 598 supported by the light source 641 operating at the wavelength $\lambda_2$ is analogous. Light is coupled into the fiber end 643 and the resultant light beam 645 passes through a polarization scrambler 647. The light beam 645 is then split by a 3 by 3 coupler 649 into three light beams 651, 653, and 655. The light beam 651 exits the fiber end 656 that is optimized to reduce back reflection and is lost. The clockwise counter propagating light beam 655 transverses the Sagnac loop 658 of the sensor 598, being cross-coupled by the wavelength division multiplexing elements 625 and 627 into polarization scrambler 657 and cross-coupled back toward the 3 by 3 central coupler 649 by the wavelength division multiplexing elements 620 and 621. The counterclockwise propagating light beam 653 traverses the Sagnac loop 658 in the opposite direction before returning to the 3 by 3 coupler 649. The light beams 653 and 655 interfere and output signals 659 and 660 that are 120° out of phase with respect to each other, are directed toward the output detectors 661 and 662. The outputs 671 and 673 of the detectors 661 and 662 are then directed into the signal processor 640 which in turn uses the sum and ratio of the signals from the two Sagnac interferometers 596 and 598, operating independently on wavelengths $\lambda_1$ and $\lambda_2$, respectively to calculate the amplitude output signal 675 of the environmental signal, and the location output signal 677. In order to assure that the light sources 601 and 641 do not add excess noise to the sensor system 594, closed loop light source drivers 679 and 681 may be employed as before.

FIG. 15 illustrates how a Sagnac secure communication system (system 30 of FIG. 1 for example) can be combined with a Sagnac distributed sensor system (system 564 of FIG. 14 for example) to provide a secure communication system 685 with increased security. In system 685, the light sources 36, 601 and 641 are chosen to have different center wavelengths $\lambda_3$, $\lambda_1$, and $\lambda_2$ so that the system 30 and system 564 operate independently of each other. The sensor 596 is coupled into the Sagnac loop 56 of the system 30 by wavelength division multiplexing fiber beamsplitters 687, 689, 691 and 693. Since wavelength division multiplexing fiber beamsplitters 620, 621, 625, 627, 687, 689, 691 and 693 can be constructed to be very frequency sensitive, there is little danger that data impressed at phase modulator 58 will appear at the detectors 629, 631, 661 or 662 of the intrusion alarm sensors 596 or 598.

Figures 16, 17:
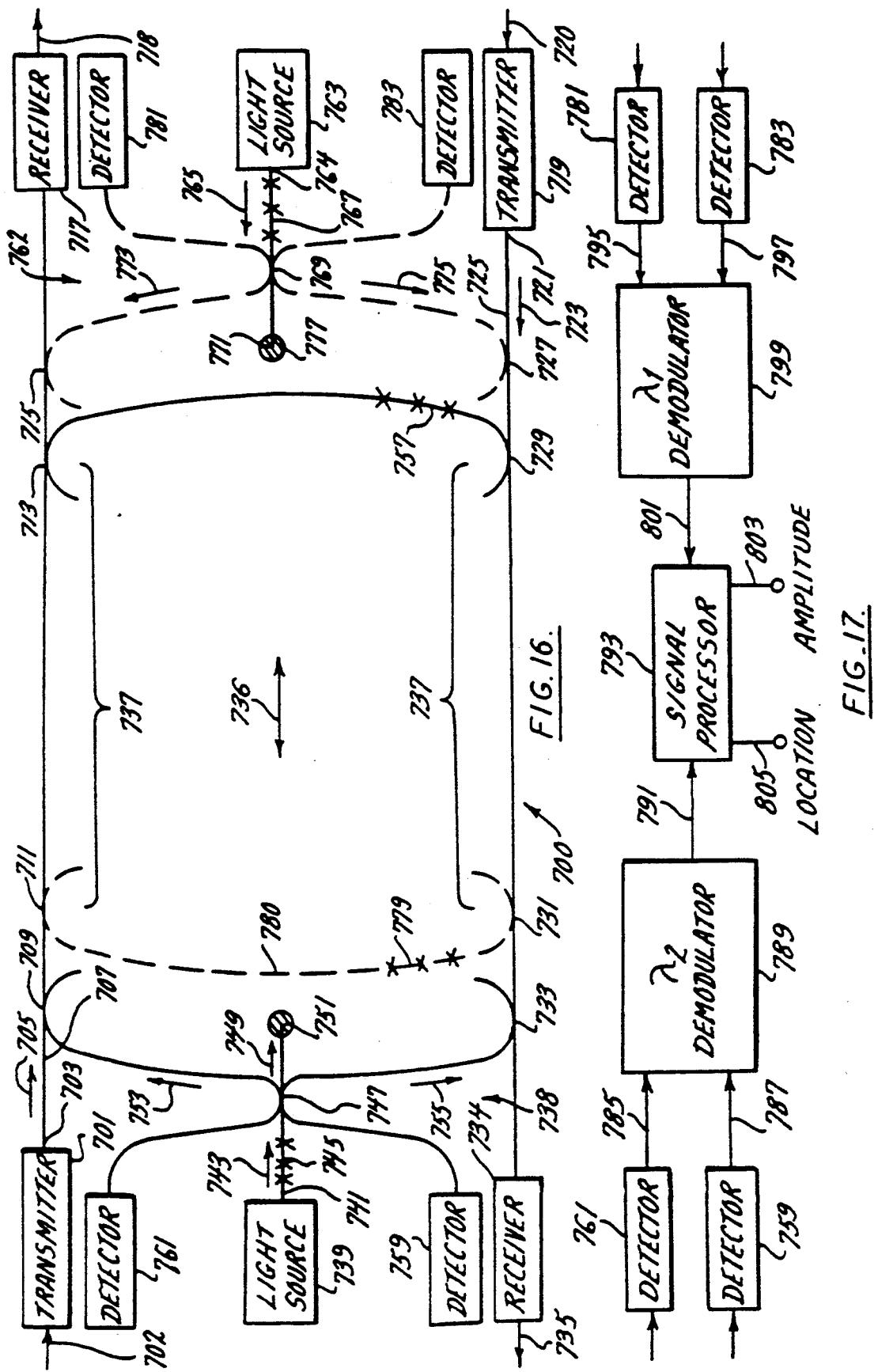
FIG. 16 is a schematic diagram of another configuration using the system of FIG. 14 to form a secure full duplex fiber optic communication system.
FIG. 17 is a block diagram of the support electronics, communication links, and interfaces for the secure full duplex fiber optic communication system of FIG. 16.

FIG. 16 illustrates the application of the wavelength division multiplexed Sagnac distributed sensor using 3 by 3 couplers for a secure full duplex communication system 700. The transmitter 701, which could be part of almost any type of optical fiber communication system operating at a wavelength $\lambda_3$, is used to couple a light encoded data stream 702 into the end of the fiber 703. The resulting light beam 705, which carries the data, propagates through the fiber 707 past a wavelength division multiplexing element 709 that is designed to pass light centered about the wavelength $\lambda_3$ straight through. In a similar manner, the light beam 705 passes straight through the successive wavelength division multiplexing elements 711, 713, and 715. The light beam 705 then reaches the receiver 717 and the data carried by the light beam 705 is extracted as output 718. In the opposite direction, the transmitter 719 converts a second input data stream 720 to a light encoded signal with a central wavelength centered about wavelength $\lambda_3$ (in general this could also be another wavelength that is also passed straight through by the wavelength division multiplexing elements). The second input 720 is coupled into the fiber end 721. The resultant light beam 723 propagates through the fiber 725 and straight through wavelength division multiplexing elements 727, 729, 731, and 733, which are designed to pass light beams whose spectral output is close to the wavelength $\lambda_3$. The light beam 723 then falls onto the receiver 734 which in turn produces an output 735 representative of the data stream.

By using a wavelength division multiplexed Sagnac interferometer distributed sensor system 736 to detect the presence and location of a potential intruder, a section 737 of the full duplex system 700 may be secured. For sensor 738 of the system 736, a light source 739 emits light at a wavelength centered about wavelength $\lambda_2$ that is coupled into the fiber end 741. The resultant light beam 743 passes through a polarization scrambler 745 and is split into three light beams by a 3 by 3 coupler 747. One beam of light 749 exits the fiber end 751 that is designed to minimize back reflections and is lost. The clockwise beam of light 753 is cross-coupled by the wavelength division multiplexing element 709 and it continues to propagate along the optical fiber 707 through the wavelength division multiplexing element 711 that is designed to pass wavelength $\lambda_2$ straight through and cross-coupled out of the optical fiber 707 by the wavelength division multiplexing element 713 that is designed to cross-couple light centered about wavelength $\lambda_2$. The light beam 753 then passes through a polarization scrambler 757 and is cross-coupled to the optical fiber 725 by the wavelength division multiplexing element 729. It then passes through the wavelength division multiplexing unit 731 that is designed to pass light centered about the wavelength $\lambda_2$ straight through and is cross-coupled back to the central coupler 747 by the wavelength division multiplexing element 733. The counterclockwise propagating light beam 755 propagates through the Sagnac loop associated with wavelength $\lambda_2$ in the opposite direction through the elements 733, 731, 729, 757, 713, 711 and 709 back to the central coupler 747. The two beams 753 and 755 interfere with each other in the coupler 747 and the amplitude modulated signals that result are directed toward detectors 759 and 761. As described earlier these signals will be approximately 120° out of phase.

A second Sagnac interferometer 762 of the system 736 is supported by the light source 763 operating about a center wavelength $\lambda_1$. Light from the source 763 is coupled into the fiber end 764 to form the light beam 765. The light beam 765 passes through a polarization scrambler 767 and is split by a central 3 by 3 coupler 769 into three light beams 771, 773 and 775. The light beam 771 passes out of the 3 by 3 coupler via the fiber end 777 that is terminated so that back reflections are minimized. The counterclockwise beam of light 773 is cross-coupled to the optical fiber 707 by the wavelength division multiplexing element 715 that is designed to cross-couple light centered about wavelength $\lambda_1$. The light beam 773 passes straight through the wavelength division multiplexing element 713 and is cross-coupled out of the fiber 707 by the wavelength division multiplexing element 711. It then passes through a polarization scrambler 779 and is cross-coupled to the fiber 725 by the wavelength division multiplexing element 731. The light beam 773 then passes straight through the wavelength division multiplexing element 729 and is cross-coupled by the wavelength division multiplexing element 727 back to the central 3 by 3 coupler 769. The clockwise propagating light beam 775 circulates about the Sagnac loop 780 associated with the wavelength $\lambda_1$ in the opposite direction passing through the elements 727, 729, 731, 779, 711, 713, and 715 before returning to the central 3 by 3 coupler 769. The light beams 773 and 775 mix and interfere resulting in amplitude modulated light beams carrying environmentally induced frequency dependent signals to the detectors 781 and 783.

FIG. 17 illustrates in block schematic form the signal processing electronics used to support the secure full duplex fiber optic communication system of FIG. 16. The outputs 785 and 787 of the detectors 761 and 759 are fed into the demodulation system 789 used to support the operation of the Sagnac interferometer operating at wavelength $\lambda_2$. The output from the demodulator 789 is then fed via communication link 791 which could be electrical or fiber optic to a central signal processor 793. In a similar manner the outputs 795 and 797 from the detectors 781 and 783 are fed into a demodulator 799, which supports the Sagnac interferometer operating at wavelength $\lambda_1$. The output from the demodulator 799 is fed to the central processor 793 on communications link 801. The processor 793 calculates the amplitude output 803 by summing the demodulated signals and the location output 805 by taking the ratio thereof.

Figure 18:
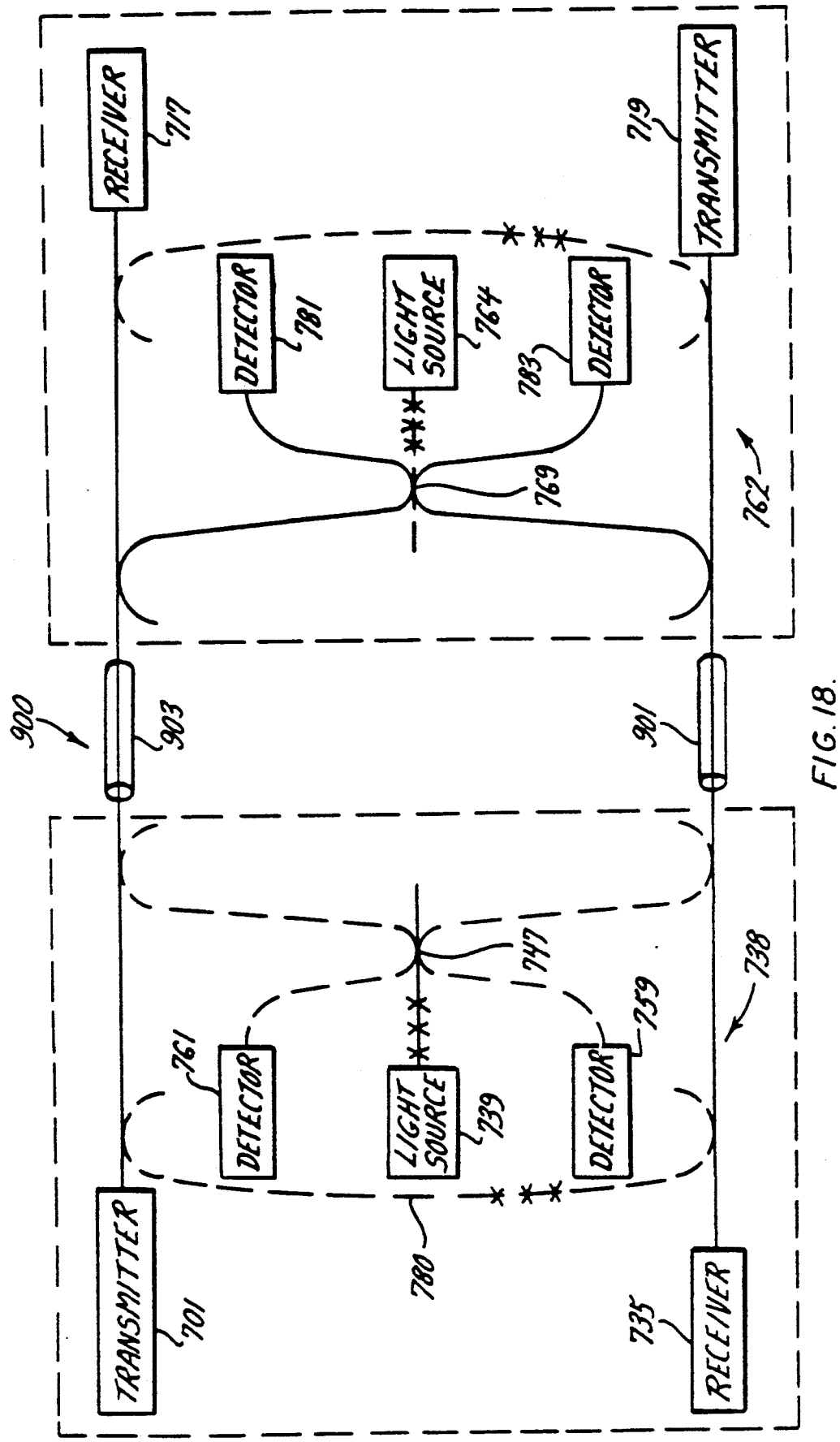
FIG. 18 is a schematic diagram of a full duplex secure communication system using a wavelength division multiplexed Sagnac distributed sensor with optimized acoustically sensitive fiber coatings to support an alarm.

In many cases, it is desirable to place both fibers of a full duplex secure fiber optic system, such as that shown in FIG. 16, in the same cable. If the system is perfectly symmetric, the sensitivity of the Sagnac loops to frequency dependent environmental effects on the cable will be canceled out to first order. There are a number of means to remove the symmetry that may be used individually or in combination. FIG. 18 illustrates a system 900 where the symmetry has been removed by coating the fibers. In this case the fiber 901 has been coated with a material such as Hytrel, a product that can be used as a coating to enhance acoustic sensitivity of the fiber 901, while the fiber 903 running in parallel to the fiber 901 has been desensitized to acoustic effects. Applying a metallic coating is one way to acoustically desensitize an optical fiber. When an acoustic wave hits the cable at a wavelength that is large compared to the diameter of the cable containing these two differently coated fibers 901 and 903, the net result is a differential optical pathlength response that the Sagnac interferometers 738 and 762 may detect to first order.

Figure 19:
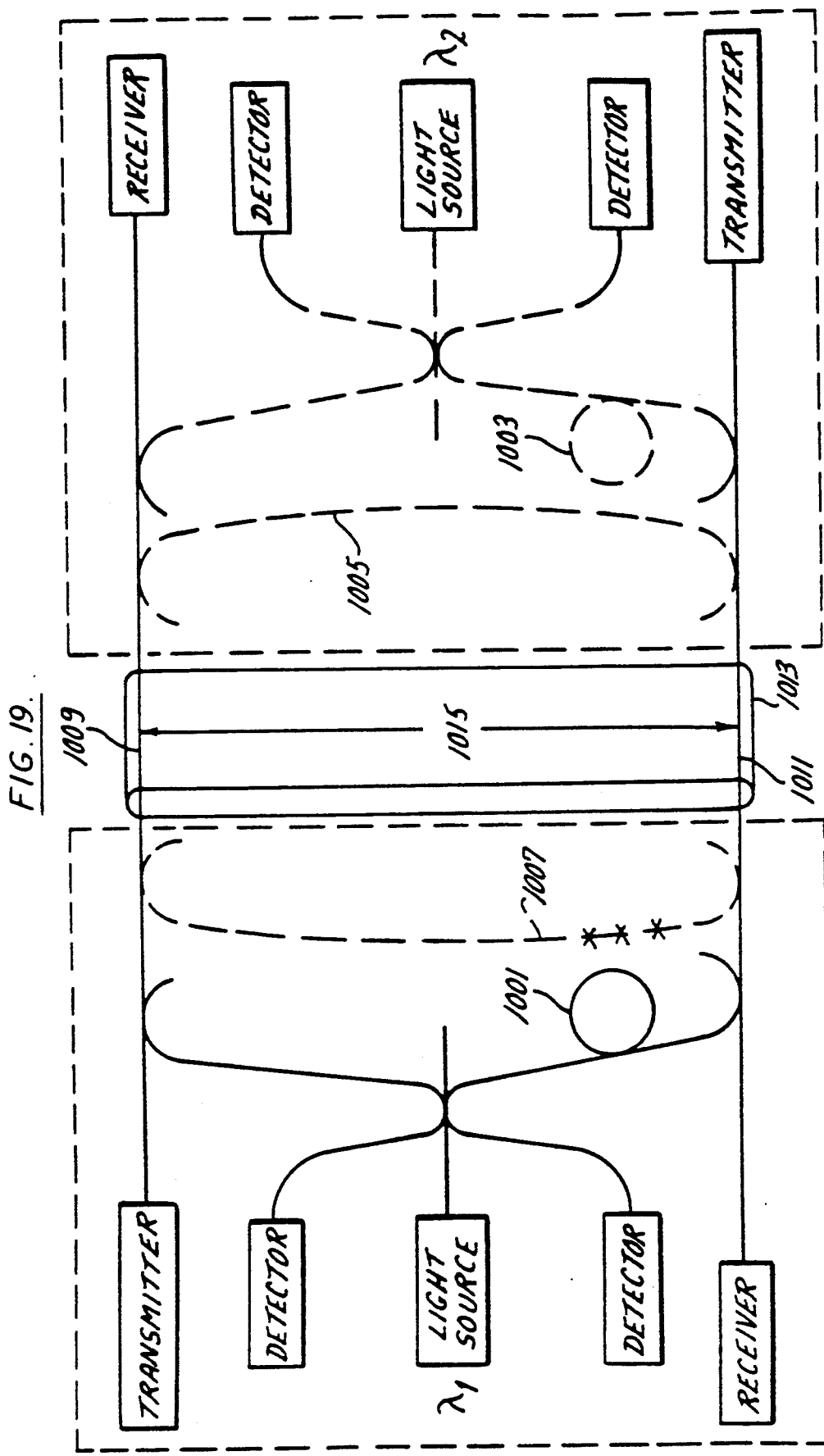
FIG. 19 is a schematic diagram of a full duplex secure fiber optic communication system using offset fiber optic coils with a wavelength division multiplexed Sagnac distributed sensor to optimize sensitivity to environmental effects that happen to the fibers at the same location along the secure link.

Another approach is illustrated system 1000 of FIG. 19. Here offset fiber coils 1001 and 1003 are placed in the Sagnac loops 1005 and 1007 so if the two fibers 1009 and 1011 are placed in the same fiber cable 1013, the counter propagating beams from each will arrive at location 1015 with time offsets of Ln/c where L is the length of the offset coil 1001 or 1003. Thus if a frequency dependent environmental effect arrives at the position 1015 of the cable 1013 containing fibers 1009 and 1011, there will be a net differential phase shift between the counter propagating light beams because of their different arrival time. In general, it should be noted that the lengths of the fiber offset coils 1001 and 1003 need not be equal, although unequal coil lengths will change the relative sensitivity of the two Sagnac loops 1005 and 1007.

Figure 20:
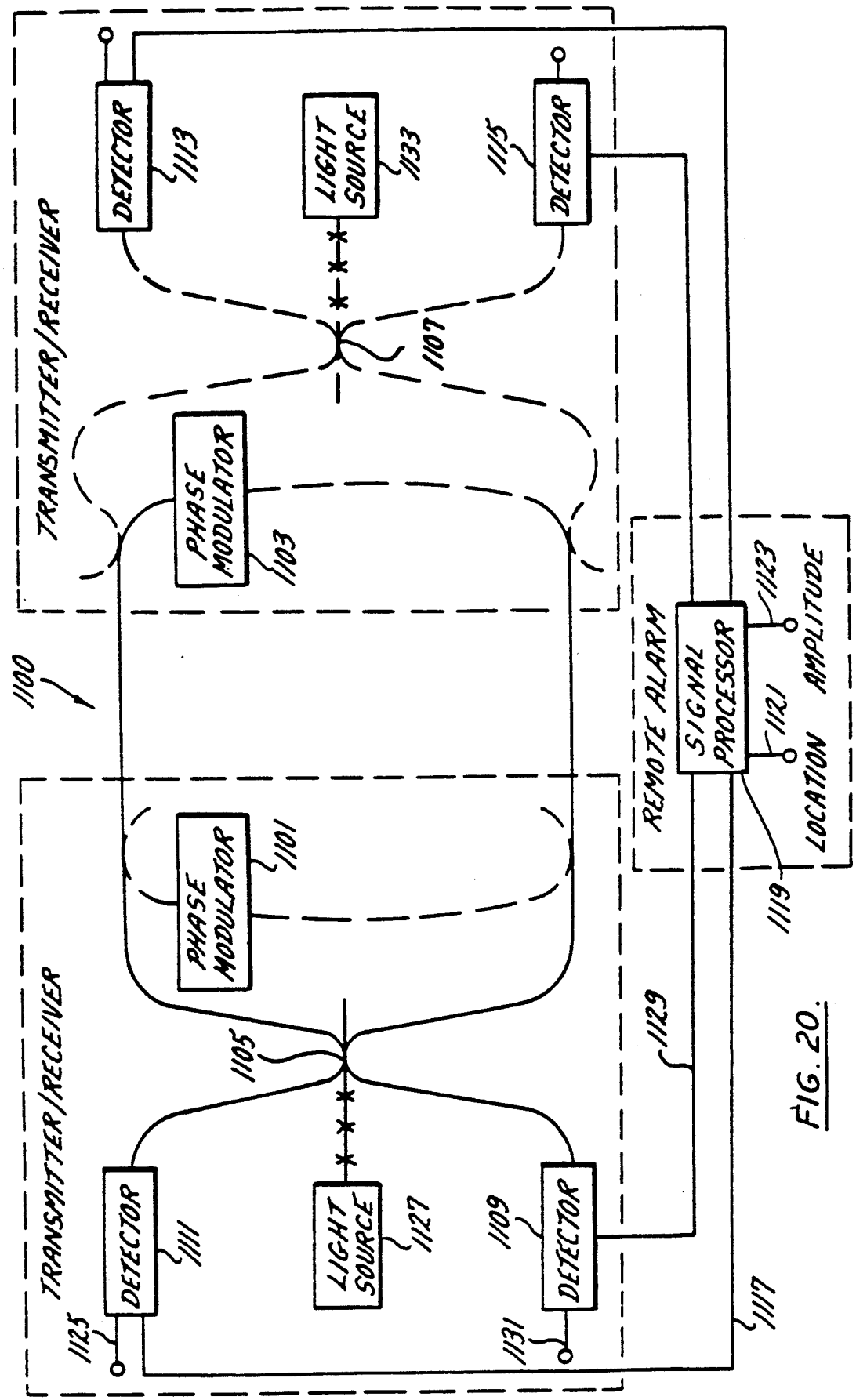
FIG. 20 is a schematic diagram of a passively biased wavelength division multiplexed Sagnac distributed alarm supporting a Sagnac secure fiber optic communication system.

It is also possible to implement the passively biased wavelength division multiplexed Sagnac distributed sensor in combination with a Sagnac secure fiber optic communication system as shown in the system 1100 of FIG. 20. This implementation incorporates a wavelength division multiplexed Sagnac distributed sensor as an alarm in a manner similar to that described in association with FIG. 14. The phase modulators 1101 and 1103 are used to impress data securely onto the counter propagating light beams of the wavelength division multiplexed Sagnac loops as described in association with FIG. 10. When the counter propagating light beams recombine on the central couplers 1105 and 1107, the amplitude modulated signals that result are directed toward the detectors 1109, 1111, 1113 and 1115. These signals contain both the output data streams from the Sagnac secure fiber optic communication system as well as signals resulting from frequency dependent environmental effects that can be used to signal the presence of a potential intruder. In general, the data communication signals will be at a very high frequency compared to the environmentally induced signals. A typical example would be data running at 300 MBPS while the alarm system looks for acoustic signatures in the 50-5000 Hz regime. The separation of these signals can be handled in a number of different ways. One method is to use two detectors for each of the output legs. As an example, the amplitude modulated light beam directed toward the detector 1111 is split onto two separate detector portions. One detector portion is optimized for maximum sensitivity to frequencies in the 50-5000 Hz regime and its output 1117 is directed toward the signal processor 1119 that is used to determine the output location 1121 and amplitude output 1123 representative of a disturbance. The second detector portion that forms detector 1111 is optimized for maximum sensitivity to high speed transmission, 300 MBPS in the earlier example. Its output 1125 is directed toward the output data formatter of the Sagnac secure fiber optic communication system. The second detector 1109 of the Sagnac interferometer supported by the light source 1127 is arranged in a similar manner with dual detector portions and alarm signal and data outputs 1129 and 1131, respectively. The second Sagnac interferometer supported by the light source 1133 behaves in a similar manner.

As an alternative to using two separate detector portions, a single detector could be used and the high frequency data could be separated from the low frequency alarm signal by electronic filtering. This latter approach has the potential disadvantage of compromising the optimum sensitivity of the output detector forcing use of a detector that must cover a broad frequency range. One other interesting feature of the 3 by 3 coupler approach is that it allows two separate data paths that could be used to support error checks of the output data or to improve signal-to-noise ratio by using both output detectors 1109 and 1111, and 1113 and 1115 in conjunction with each other.

Figure 21:
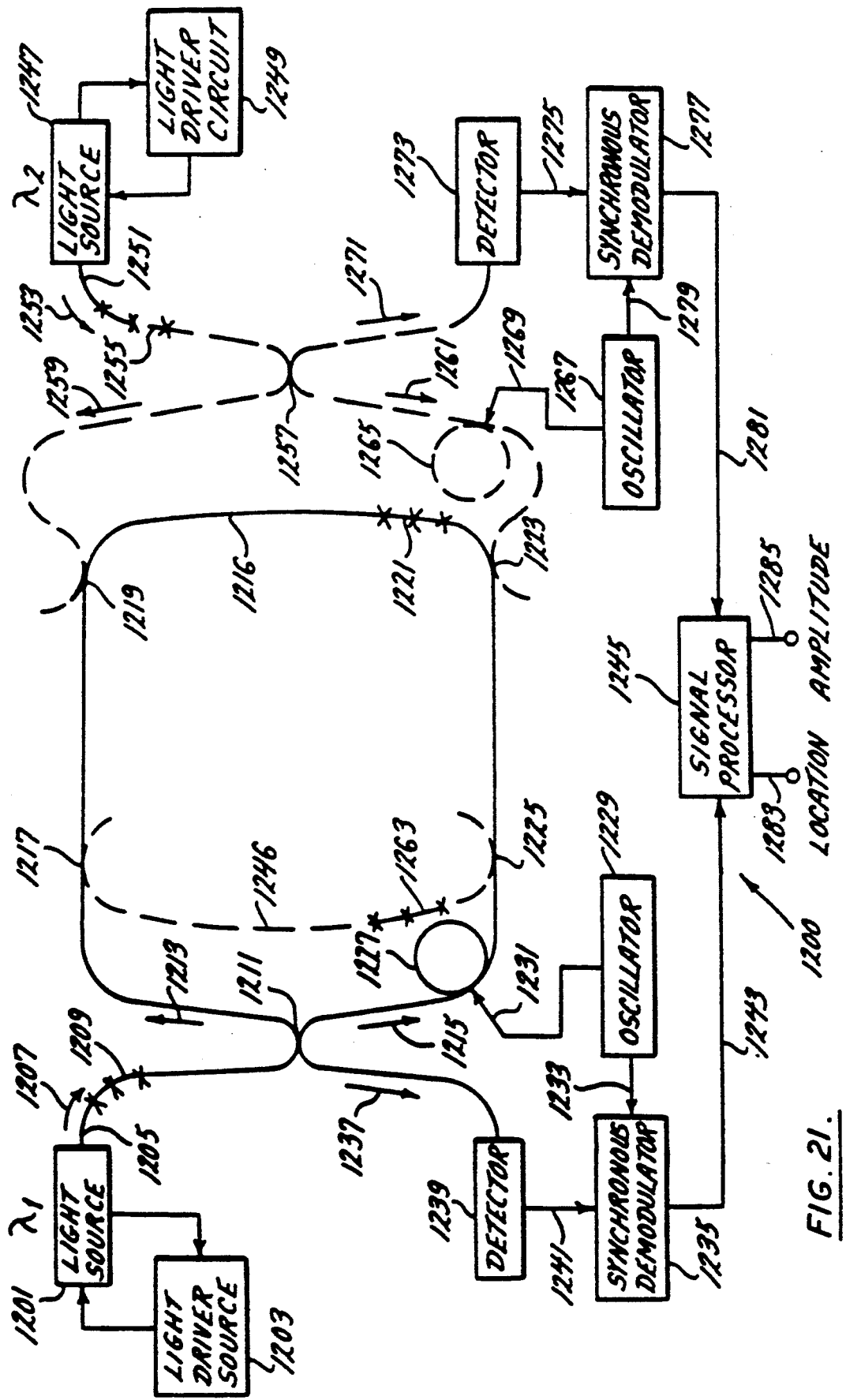
FIG. 21 is a schematic diagram of a basic wavelength division multiplexed Sagnac distributed sensor using dynamic biasing provided by an oscillating phase modulator in the Sagnac loop.

In addition to passive biasing of the wavelength division multiplexed Sagnac distributed sensor, it is possible to use dynamic biasing techniques such as those employed in association with the fiber optic gyros. FIG. 21 illustrates a wavelength division multiplexed Sagnac distributed sensor 1200 of this type. A light source 1201 operating about a center wavelength $\lambda_1$ is stabilized by the light source driver 1203 and couples light into the fiber end 1205. The resulting light beam 1207 passes through a polarization scrambler 1209 and is split by a central coupler 1211 into counter propagating light beams 1213 and 1215 for travel around the Sagnac loop 1216. The clockwise propagating light beam 1213 passes the wavelength division multiplexing elements 1217 and 1219 that are designed to pass light centered about the wavelength $\lambda_1$ straight through to a polarization scrambler 1221. The light beam 1213 then passes through wavelength division multiplexing elements 1223 and 1225 to a phase modulator 1227 and returns to the central coupler 1211. The counterclockwise propagating light beam 1215 traverses the Sagnac loop 1216 through the elements 1227, 1225, 1223, 1221, 1219 and 1217 before returning to the central coupler 1211. The phase modulator 1227 is driven by the oscillator 1229 with a sinusoidal output 1231 to introduce an oscillating non reciprocal phase shift between the counter propagating light beams 1213 and 1215. The oscillator 1229 also provides the same sinusoidal signal as an output 1233 to a synchronous demodulator 1235. When there is no frequency dependent environmental effect acting on the Sagnac loop 1216, the two counter propagating light beams 1213 and 1211 mix and produce an amplitude modulated signal 1237 that is directed to the output detector 1239 and whose content is largely second and higher order even harmonics of the sinusoidal drive signal 1231 applied to the phase modulator 1227. When a frequency dependent environmental signal hits the Sagnac loop 1216, the amplitude modulated signal 1237 will contain first harmonics of the drive signal 1231 of the phase modulator 1227. The amplitude of the first (and higher order odd) harmonic will be proportional to the amplitude of the environmental effect and its location and the resultant electrical signal output 1241 of the detector 1239 is synchronously demodulated at the drive frequency of the sinusoidal oscillator 1229. The resulting output 1243 of the synchronous demodulator 1235 is then fed into the signal processor 1245. The second Sagnac loop 1246 is supported by the light source 1247 operating about a center wavelength $\lambda_2$ whose output is stabilized via the light source driver circuitry 1249. The light source 1247 couples light into the fiber end 1251. The resulting light beam 1253 propagates through a polarization scrambler 1255 and is split by a central coupler 1257 into counter propagating light beams 1259 and 1261. The counterclockwise propagating light beam 1259 is cross-coupled by the wavelength division multiplexing elements 1219 and 1217 to a polarization scrambler 1263. It then is cross-coupled by the wavelength division multiplexing elements 1225 and 1223 to a phase modulator 1265 and returns to the central coupler 1257. The clockwise propagating light beam 1261 traverses the Sagnac loop 1246 via the elements 1265, 1223, 1225, 1263, 1217, and 1219 before returning to the central coupler 1257. An oscillator 1267 applies a sinusoidal output 1269 to the phase modulator 1265. The action of the phase modulator 1265 in turn is used to induce a sinusoidally varying phase shift between the counter propagating light beams 1259 and 1261 for demodulation purposes. When the two beams 1259 and 1261 recombine after circulating through the Sagnac loop 1246, they interfere with each other and the resultant amplitude modulated signal 1271 is directed toward the output detector 1273. The output 1275 from the detector 1273 is directed to the synchronous demodulator 1277 which in turn receives a sinusoidal drive signal 1279 from the oscillator 1267 for demodulation purposes. The resulting output 1281 is directed to the signal processor 1245, which uses the inputs 1243 and 1281 to produce a location output 1283 and an amplitude output 1285 of the environmental effect.

Figure 22:
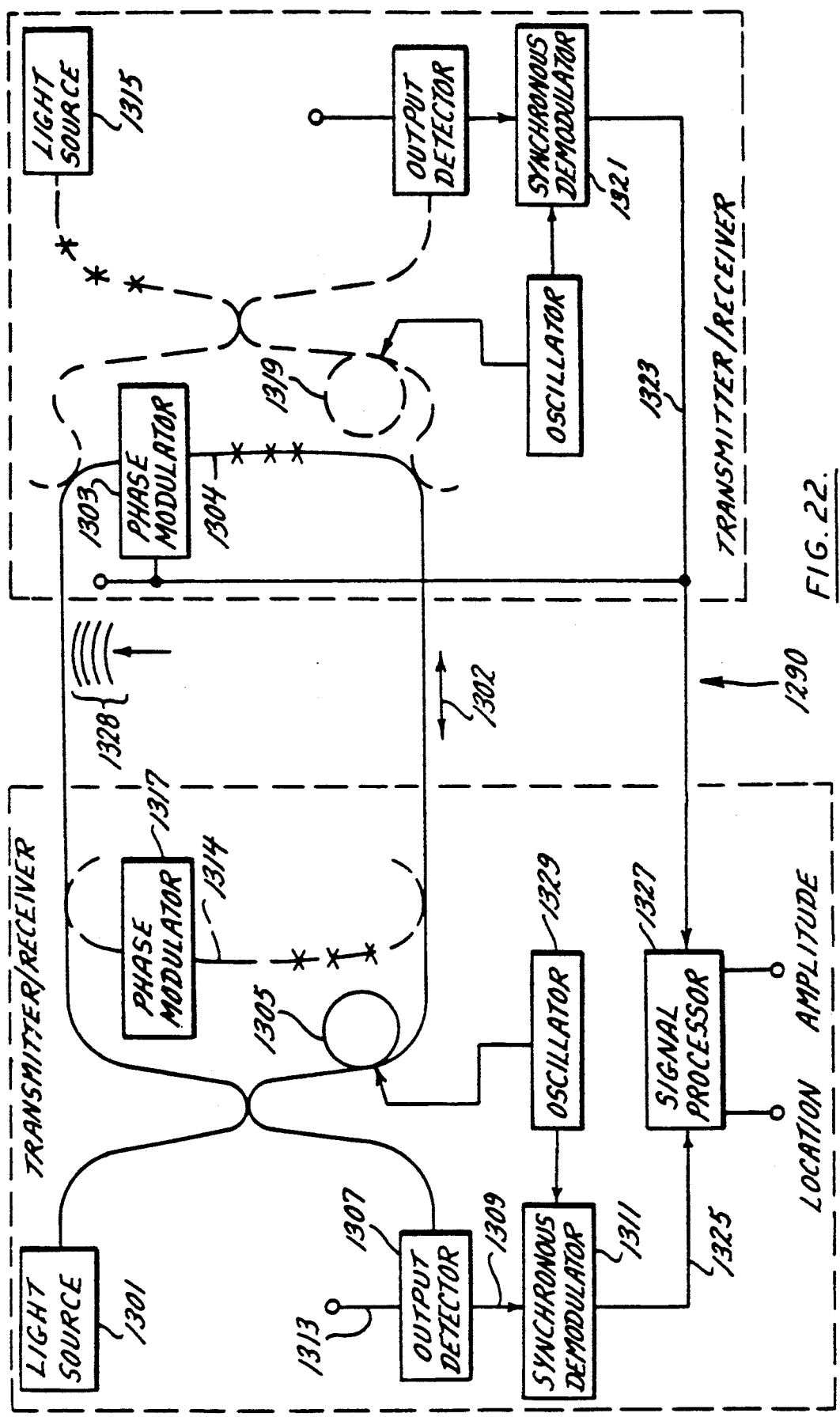
FIG. 22 is a schematic diagram of an implementation of the dynamically biased wavelength division multiplexed Sagnac distributed sensor to act as an alarm system for the Sagnac secure fiber optic communication system.

This technique of using dynamic biasing to implement a wavelength division multiplexed Sagnac distributed sensor may be applied in analogous fashion to all the embodiments described in association with the 3 by 3 coupler approach using passive biasing (the basic system described in association with FIG. 13 could be applied to the embodiments described in association with the passive biasing approach as well). As an example, FIG. 22 shows a system 1290 with a wavelength division multiplexed Sagnac distributed sensor using dynamic biasing combined with a Sagnac secure fiber optic communication system. In system 1290, a the light source 1301, operating about a center wavelength $\lambda_1$, is used to support a Sagnac interferometer 1302 that uses a phase modulator 1303 to support secure data transmission and a second phase modulator 1305 to support the wavelength division multiplexed Sagnac distributed sensor that is used to support an alarm for the system 1290. The amplitude modulated signals from the Sagnac loop 1304 operating at wavelength $\lambda_1$ are directed to an output detector 1307. This detector 1307 could consist of two separate detectors optimized for maximum sensitivity at the secure data rate and the alarm phase modulator operating frequency. The output 1309 from the detector 1307, optimized for alarm detection, is directed to a synchronous demodulator 1311 and processed in a manner similar to that described in association with FIG. 21. The output 1313 from the detector 1307 is used to reconstruct the data stream in a manner similar to that described above in association with the above described Sagnac secure fiber optic communication systems. It is also possible for the detector 1307 to be comprised of a single detector with the signals 1309 and 1313 being generated through electronic filtering. A second Sagnac loop 1314 is supported by a light source 1315 operating about a center wavelength $\lambda_2$. Data is transmitted securely via phase modulator 1317 and an alarm signal is supported via phase modulator 1319. The output signals 1323 and 1325 from the synchronous demodulators 1321 and 1311 are fed into an output signal processor 1327. The physical connections to transport these signals could be separate lines or the output could be sent securely via the secure data transmission links. The location and amplitude of the frequency dependent environmental effect 1328 on the secure line can then be determined at one end of the communication link and the information securely transmitted to the other end. It is possible to impress the alarm signal on the phase modulator 1303 and eliminate the second phase modulator 1305. However, separate modulators 1303 and 1305 are advantageous because the oscillator 1329 and synchronous demodulator 1311 can be collocated with the dual modulator approach simplifying support electronic requirements.

Thus there has been shown and described novel Sagnac secure fiber optic communication systems, supporting alarms, and distributed sensors which fulfill all the objects and advantages sought therefor. Many changes, modifications, variations, uses and applications of the subject invention will however will become apparent to those skilled in the art after considering this specification and the accompanying drawings. All such changes, modifications, alterations and other uses and applications which do not depart from the spirit and scope of the invention are deemed to be covered by the invention which is limited only by the claims which follow.

I claim:
1. A communication system including:
   a first fiber optic beamsplitter having:
   a first arm;
   a second arm;
   a third arm; and
   a fourth arm;
   a first light source that produces a first beam of light into said first arm, said first fiber optic beamsplitter splitting said first beam of light into second and third beams of light on said third and fourth arms respectively;
   a first optical pathway connecting said third arm to said fourth arm, said first optical pathway conducting said second and third beams of light from said third and fourth arms to said fourth and third arms respectively, said first optical pathway having:
   a center;
   a first optical phase modulator in said first optical pathway spaced from said center thereof said first optical phase modulator having:
   an input for receiving a first information signal that said first optical phase modulator uses to phase modulate said second and third beams of light, whereby upon the return of said second and third beams of light to said first fiber optic beamsplitter, said second and third beams of light combine into an amplitude modulated fourth beam of light conducted on said second arm whose amplitude varies with said first information signal; and
   a first detector connected to receive said fourth beam of light from said second arm and to produce therefrom a first output signal representative of said first information signal.

2. The communication system as defined in claim 1 further including:
   a polarization scrambler positioned between said first light source and said first arm to scramble the polarization of said first beam of light.

3. The communication system as defined in claim 1 further including:
   a polarization scrambler positioned in said first optical pathway to scramble the polarization of said second and third beams of light.

4. The communication system as defined in claim 1 further including:
   a polarization scrambler positioned between said first light source and said first arm to scramble the polarization of said first beam of light; and
   at least one polarization scrambler positioned in said first optical pathway to scramble the polarization of said second and third beams of light.

5. The communication system as defined in claim 1 further including:
   a data formatter that provides the first information signal to said first optical phase modulator input in bursts spaced in time at least the twice the shortest time it takes either the second or third beam of light to travel from said first optical phase modulator to said center; and
   a data reformatter connected to receive said output signal representative of the first information signal from said first detector and extract therefrom the first information signal.

6. The communication system as defined in claim 5 wherein said burst of first information signal phase modulated into said second beam of light travels to and clears said first fiber optic beamsplitter before said burst of first information signal phase modulated into said third beam of light arrives at said first fiber optic beamsplitter so that each burst of first information signal is output from said detector twice, said data reformatter including:

means to compare the first information signals for errors and produce therefrom a verified output first information signal.

7. The communication system as defined in claim 6 wherein said data reformatter includes:
means to produce an alarm signal upon finding a predetermined number of errors during the comparison.

8. The communication system as defined in claim 1 further including:
a data formatter that integrates the first information signal to said phase modulator input, the first information signal being differentiated by said system to produce the first information signal at said first detector.

9. The communication system as defined in claim 1 further including:
a data formatter that inputs the first information signal to said first optical phase modulator input in the form of sawtooth pulses, the first information signal being differentiated to square wave pulses by said system to produce the first information signal at said first detector in digital form.

10. The communication system as defined in claim 1 wherein said first optical pathway is an optical fiber pathway.

11. The communication system as defined in claim 1 further including:
a first light coupler positioned in said first optical pathway between said first fiber optic beamsplitter and said first optical phase modulator generally adjacent said first optical phase modulator that splits a portion of said third beam of light therefrom;
first intensity monitoring means connected to said first light coupler for receiving the portion of said third beam of light and producing an alarm output when the intensity of the portion of said third beam of light falls outside a predetermined range;
a second light coupler positioned in said first optical pathway between said first fiber optic beamsplitter and said center generally spaced from said center a similar distance said first light coupler is spaced therefrom that splits a portion of said second beam of light therefrom; and
second intensity monitoring means connected to said second light coupler for receiving the portion of said second beam of light and producing an alarm output when the intensity of the portion of said second beam of light falls outside a predetermined range.

12. The communication system as defined in claim 11 wherein said first intensity monitoring means has:
a first intensity output, and wherein said second intensity monitoring means has:
a second intensity output, said communication system further including:
intensity comparing means connected to receive said first and second intensity outputs from said first and second intensity monitoring means, said intensity comparing means producing an alarm output when said first and second intensity outputs from said first and second intensity monitoring means have relative variation outside a predetermined range.

13. The communication system as defined in claim 1 further including:
a pathlength changer positioned in said first optical pathway.

14. The communication system as defined in claim 13 wherein said pathlength changer includes:
a random pathlength generator positioned near said center, said random pathlength generator including:
a piezoelectric cylinder; and
an optical fiber wrapped around said piezoelectric cylinder.

15. The communication system as defined in claim 14 wherein said pathlength changer includes:
control means connected to said random pathlength generator and operatively connected to said first optical phase modulator to coordinate pathlength changes with transmission of the first information signal so that first information signal is not lost during a pathlength change.

16. The communication system as defined in claim 13 wherein said pathlength changer includes:
at least one optical switch in said first optical pathway; and
at least one length of optical fiber connected to said optical switch so that said optical switch can add and remove said at least one length of optical fiber to said first optical pathway.

17. The communication system as defined in claim 1 further including:
a first light coupler positioned in said first optical pathway near said center thereof, said first light coupler having:
a first coupler arm in said first optical pathway facing said third arm of said first fiber optic beamsplitter;
a second coupler arm in said first optical pathway facing said first optical phase modulator;
a third coupler arm; and
a fourth coupler arm, said first light coupler splitting a portion of said second beam of light onto said fourth coupler arm and a portion of said third beam of light onto said third coupler arm;
first intensity monitoring means connected to said third coupler arm for receiving the portion of said third beam of light and producing an alarm output when the intensity of the portion of said third beam of light falls outside a predetermined range; and
second intensity monitoring means connected to said fourth coupler arm for receiving the portion of said second beam of light and producing an alarm output when the intensity of the portion of said second beam of light falls outside a predetermined range.

18. The communication system as defined in claim 17 wherein said first intensity monitoring means has:
a first intensity output, and wherein said second intensity monitoring means has:
a second intensity output, said communication system further including:
intensity comparing means connected to receive said first and second intensity outputs from said first and second intensity monitoring means, said intensity comparing means producing an alarm output when said first and second intensity outputs from said first and second intensity monitoring means have relative variation above a predetermined range.

19. The communication system as defined in claim 1 further including:

a plurality of first light couplers positioned in said first optical pathway between said first fiber optic beamsplitter and said first optical phase modulator generally adjacent said first optical phase modulator, each first light coupler splitting a portion of a different wavelength band from said third beam of light;

a plurality of first intensity monitoring means, each connected to one of said plurality of first light couplers for receiving a portion of said third beam of light and producing an alarm output when the intensity of the portion said third beam of light of the wavelength band falls outside a predetermined range;

a plurality of second light couplers positioned in said first optical pathway between said first fiber optic beamsplitter and said center generally spaced from said center a distance similar to the distance said first light couplers are spaced therefrom, each second light coupler splitting a portion of a different wavelength band from said second beam of light; and a plurality of second intensity monitoring means, each connected to one said plurality of second light couplers for receiving the portion of said second beam of light split thereby and producing an alarm output when the intensity of the portion of said second beam of light of the wavelength band falls outside a predetermined range.

20. The communication system as defined in claim 19 wherein each of said plurality of said first intensity monitoring means has:

a first intensity output, and wherein each of said plurality of said second intensity monitoring means has:

a second intensity output, said communication system further including:

a plurality of intensity comparing means, each connected to receive said first and second intensity outputs of a single wavelength band from one of said first and second intensity monitoring means, said each of said intensity comparing means producing an alarm output when said first and second intensity outputs from said connected first and second intensity monitoring means have relative variation outside a predetermined range.

21. The communication system as defined in claim 1 further including:

a first dispersive tap positioned in said first optical pathway between said first fiber optic beamsplitter and said first optical phase modulator generally adjacent said phase modulator splitting a portion of said third beam of light into different wavelength bands;

first intensity monitoring means including:

a first detector array for receiving the different wavelength bands of the portion of said third beam of light and producing an alarm output when the intensity of the portion of said third beam of light of any of the wavelength bands falls outside a predetermined range;

a second dispersive tap positioned in said first optical pathway between said first fiber optic beamsplitter and said center generally spaced from said center a similar distance said first dispersive tap is spaced therefrom splitting a portion of said second beam of light into different wavelength bands;

second intensity monitoring means including:

a second detector array for receiving the different wavelength bands of the portion of said second beam of light and producing an alarm output when the intensity of the portion of said second beam of light of any of the wavelength bands falls outside a predetermined range.

22. The communication system as defined in claim 21 wherein said first intensity monitoring means has:

a plurality of first intensity outputs, and wherein said second intensity monitoring means has:

a plurality of second intensity outputs, said communication system further including:

intensity comparing means connected to receive said pluralities of first and second intensity outputs of a single wavelength band from one of said first and second intensity monitoring means, said intensity comparing means comparing first and second intensity outputs from the same wavelength bands and producing an alarm output when said first and second intensity outputs from the same wavelength band have relative variation outside a predetermined range.

23. The communication system as defined in claim 1 further including:

a signal generator producing low frequency output signals;

an alarm phase modulator positioned in said first optical pathway spaced from said center thereof connected to receive said low frequency output signals from said signal generator, whereby said alarm phase modulator impresses said low frequency output signal on said second and third beams of light that appears on said amplitude modulated fourth beam of light;

filter means connected to receive said output signal representative of said first information signal and extract said low frequency output signal therefrom; and synchronous demodulator means connected to said low frequency output signals from said signal generator and said filter means to produce therefrom an alarm signal when the power level in said fourth beam of light changes beyond a predetermined amount.

24. The communication system as defined in claim 1 further including:

a signal generator producing low frequency output signals and connecting a low frequency output signal to said first optical phase modulator, whereby said first optical phase modulator impresses said low frequency output signal on said second and third beams of light that appears on said amplitude modulated fourth beam of light;

filter means connected to receive said output signal representative of said first information signal and extract said low frequency output signal therefrom; and synchronous demodulator means connected to said low frequency output signals from said signal generator and said filter means to produce therefrom an alarm signal when the power level in said fourth beam of light changes beyond a predetermined amount.

25. The communication system as defined in claim 1 further including:

a second fiber optic beamsplitter having:
 a fifth arm;
 a sixth arm;

a seventh arm; and
an eighth arm;
a second light source that produces a fifth beam of light at a center wavelength different from said first beam of light into said fifth arm, said second fiber optic beamsplitter splitting said fifth beam of light into sixth and seventh beams of light on said sixth and seventh arms respectively;
a first wavelength division multiplexing beamsplitter connecting said sixth arm to said first optical pathway between said center thereof and said first fiber optic beamsplitter;
a second wavelength division multiplexing beamsplitter connecting said seventh arm to said first optical pathway between said first optical phase modulator and said first fiber optic beamsplitter;
a third wavelength division multiplexing beamsplitter connected to said first optical pathway between said first wavelength division multiplexing beamsplitter and said first fiber optic beamsplitter;
a fourth wavelength division multiplexing beamsplitter connected to said first optical pathway between said second wavelength division multiplexing beamsplitter and said first fiber optic beamsplitter, said third and fourth wavelength division multiplexing beamsplitters being connected together, and said second fiber optic beamsplitter, said first, second, third, and fourth wavelength division multiplexing beamsplitters and connecting portions of said first optical pathway forming a second optical pathway, said second optical pathway having:
a second center positioned between said third and fourth wavelength division multiplexing beamsplitters, said second optical pathway conducting said sixth and seventh beams of light from said sixth and seventh arms to said seventh and sixth arms respectively;
a second optical phase modulator in said second optical pathway spaced from said second center thereof; said second optical phase modulator having:
an input for receiving a second information signal that said second optical phase modulator uses to phase modulate said sixth and seventh beams of light, whereby upon the return of said sixth and seventh beams of light to said second fiber optic beamsplitter, said sixth and seventh beams of light combine into an amplitude modulated eighth beam of light conducted on said eighth arm whose amplitude varies with said second information signal; and
a second detector connected to receive said eighth beam of light from said eighth arm and to produce therefrom a second output signal representative of said second information signal.

26. The communication system as defined in claim 25 further including:
a polarization scrambler positioned between said second light source and said fifth arm to scramble the polarization of said fifth beam of light.

27. The communication system as defined in claim 25 further including:
a polarization scrambler positioned in said second optical pathway to scramble the polarization of said sixth and seventh beams of light.

28. The communication system as defined in claim 25 further including:

a first polarization scrambler positioned between said second light source and said fifth arm to scramble the polarization of said fifth beam of light; and
at least one other polarization scrambler positioned in said second optical pathway to scramble the polarization of said sixth and seventh beams of light.

29. The communication system as defined in claim 25 wherein said first optical pathway has:
first and second opposite sides, said communication system further including:
a first Sagnac interferometer distributed fiber optic sensor facing said first side;
a second Sagnac interferometer distributed fiber optic sensor facing said second side; and
a signal processor connected to said first and second Sagnac interferometer distributed fiber optic sensors to calculate the amplitude and position of any frequency dependent environmental effect that occurs between said first side and said second side.

30. The communication system as defined in claim 29 wherein said first Sagnac interferometer distributed fiber optic sensor includes:
a first length of optical fiber positioned in one of said second and third arms of said first fiber optic beamsplitter whereby said one of said second and third arms of said first fiber optic beamsplitter is optically longer than the other.

31. The communication system as defined in claim 30 further including:
a second length of optical fiber positioned in one of said fifth and sixth arms of said second fiber optic beamsplitter whereby said one of said fifth and sixth arms of said second fiber optic beamsplitter is optically longer than the other.

32. The communication system as defined in claim 31 wherein said first and second lengths of optical fiber are essentially the same length.

33. The communication system as defined in claim 29 further including:
a first relatively low frequency phase shifter positioned in one of said second and third arms of said first fiber optic beamsplitter; and
a second relatively low frequency phase shifter positioned in one of said fifth and sixth arms of said second fiber optic beamsplitter.

34. The communication system as defined in claim 33 further including:
a first oscillator producing a relatively low frequency output and driving said first relatively low frequency phase shifter therewith;
a second oscillator producing a relatively low frequency output and driving said second relatively low frequency phase shifter therewith, wherein said signal processor includes:
a first synchronous demodulator connected to receive said relatively low frequency output from said first oscillator and connected to receive said first output signal from said first detector to demodulate sensor information out of said first output signal;
a second synchronous demodulator connected to receive said relatively low frequency output from said second oscillator and connected to receive said second output signal from said second detector to demodulate sensor information out of said second output signal.

35. The communication system as defined in claim 33 further including:
- a first oscillator producing a relatively low frequency output and driving said first relatively low frequency phase shifter therewith;
- a second oscillator producing a relatively low frequency output and driving said second relatively low frequency phase shifter therewith, wherein said first and second detectors each have:
  - a high frequency portion for producing information outputs; and
  - a low frequency portion that produces said sensor outputs, and wherein said signal processor includes:
  - a first synchronous demodulator connected to receive said relatively low frequency output from said first oscillator and connected to receive said first sensor output from said first detector to demodulate said first sensor output;
  - a second synchronous demodulator connected to receive said relatively low frequency output from said second oscillator and connected to receive said second sensor output from said second detector to demodulate said second sensor output.

36. The communication system as defined in claim 29 wherein said first and second detectors each include:
- a high frequency portion for detecting said first and second information signals respectively; and
- a low frequency portion for detecting environmental effects along common portions of said first and second optical pathways.

37. The communication system as defined in claim 1 further including:
- a second optical phase modulator positioned in said first optical pathway;
- a second fiber optic beamsplitter having:
  - a fifth arm;
  - a sixth arm;
  - a seventh arm; and
  - an eighth arm;
- a third fiber optic beamsplitter having:
  - a ninth arm;
  - a tenth arm;
  - an eleventh arm; and
  - a twelfth arm;
- a second light source that produces a fifth beam of light into said fifth arm, said second fiber optic beamsplitter splitting said fifth beam of light into sixth and seventh arms respectively;
- first and second optical switches connecting said sixth and seventh arms to said first optical pathway on opposite sides of said first optical phase modulator;
- third and fourth optical switches connected to said first optical pathway on opposite sides of said first fiber optic beamsplitter;
- a third optical phase modulator positioned off of said first optical pathway between said third and fourth optical switches, said third and fourth optical switches being connected together by said third optical phase modulator;
- a third light source that produces a ninth beam of light into said ninth arm, said third fiber optic beamsplitter splitting said ninth beam of light into tenth and eleventh beams of light on said tenth and eleventh arms respectively;
- fifth and sixth optical switches connected to said first optical pathway on opposite sides of said second optical phase modulator, said second fiber optic beamsplitter, said first, second, third, fourth, fifth, and sixth optical switches, said second and third optical phase modulators and connecting portions of said first optical pathway forming a second optical pathway that conducts said sixth and seventh beams of light from said sixth and seventh arms to said seventh and sixth arms respectively to form an eighth beam of light on said eighth arm, and said third fiber optic beamsplitter, said first, second, third, fourth, firth and sixth optical switches, said first and third optical phase modulators and connecting portions of said first optical pathway forming a third optical pathway that conducts said tenth and eleventh beams of light from said tenth and eleventh arms to said eleventh and tenth arms respectively to form a twelfth beam of light on said twelfth arm, said second optical phase modulator having:
  - an input for receiving a second information signal that said optical phase modulator uses to phase modulate said second and third beams of light and said sixth and seventh beams of light, whereby upon the return of said sixth and seventh beams of light to said second fiber optic beamsplitter, said sixth and seventh beams of light combine into an amplitude modulated eighth beam of light conducted on said eighth arm whose amplitude varies with said second information signal, said fourth beam of light has amplitudes that vary with said second information signal;
- a second detector connected to receive said eighth beam of light from said eighth arm and to produce therefrom a second output signal representative of said first and second information signals, said third optical phase modulator having:
  - an input for receiving a third information signal that said third optical phase modulator uses to phase modulate said sixth and seventh and said tenth and eleventh beams of light, whereby upon the return of said tenth and eleventh beams of light to said third fiber optic beamsplitter, said tenth and eleventh beams of light combine into an amplitude modulated twelfth beam of light conducted on said twelfth arm whose amplitude varies with said third information signal, and wherein said eighth beam of light has amplitudes that vary with said third information signal; and
- a third information detector connected to receive said twelfth beam of light from said twelfth arm and to produce therefrom a third output signal representative of said second and third information signals, said first output signal being representative of said first and third information signals.

38. The communication system as defined in claim 37 further including:
- means to coordinate said first, second and third optical phase modulators so that only one modulates the light beams passing through said system at a time.

39. The communication system as defined in claim 37 further including:
- means to coordinate said first, second, third, fourth, fifth, and sixth optical switches so that only one optical pathway from a fiber optic beamsplitter through at least two optical phase modulators and back to said fiber optic beamsplitter is established at a time.

40. The communication system as defined in claim 37 further including:
   a second optical repeater located a similar predetermined distance from said first fiber optic beamsplitter as said first optical repeater between said center and said fourth arm, wherein said first and second optical repeaters each include:
   a fiber amplifier positioned in said first optical pathway;
   a pump laser driver;
   a pump laser driven by said pump laser driver, which is connected thereto to produce a laser light output; and
   an amplifier optical coupler connecting said laser light output to said fiber amplifier.

41. The communication system as defined in claim 40 wherein said first and second optical repeaters each further include:
   a first tap in said first optical pathway to split a portion of light amplified by said fiber amplifier in a first direction;
   a first amplifier detector connected to receive the portion of light split by said first tap and to produce therefrom a first control signal to said pump laser driver;
   a second tap in said first optical pathway to split a portion of light amplified by said fiber amplifier in a direction opposite to said first direction; and
   a second amplifier detector connected to receive the portion of light split by said second tap and to produce therefrom a second control signal to said pump laser driver.

42. The communication system as defined in claim 1 further including:
   a first optical repeater located a predetermined distance from said first fiber optic beamsplitter between said center and said third arm.

43. The communication system as defined in claim 1 further including:
   an intruder alarm subsystem including:
      first and second Sagnac interferometer distributed fiber optic sensors positioned to face opposite directions to sense environmental effects indicative of an intruder over at least one portion of said first optical pathway.

44. The communication system as defined in claim 43 wherein said first optical pathway has:
   first and second opposite sides, and wherein said first Sagnac interferometer distributed fiber optic sensor includes:
   a first sensor central beamsplitter at least having:
      first, second, third, and fourth sensor arms;
   a first sensor light source feeding a first sensor light beam into said first sensor arm, which first sensor light beam is split by said first sensor central beamsplitter into second and third sensor light beams traveling on said second and third sensor arms respectively;
   first means coupling said second and third sensor light beams from said second and third sensor arms into and out of said first optical pathway at said first side thereof for traverse through at least a predetermined portion of said first optical pathway to be secured by said intruder alarm subsystem;
   second means coupling said second and third sensor light beams out of and into said first optical pathway at said second side thereof, said second and third light beams recombining on said first sensor central beamsplitter to form a fourth sensor light beam on said fourth sensor arm;
   a first detector positioned to receive said fourth light beam from said fourth sensor arm and produce therefrom a first sensor output whose intensity is an indication of the position and amount of disturbance in said predetermined portion of said first optical pathway to be secured by said intruder alarm subsystem, and wherein said second Sagnac interferometer distributed fiber optic sensor includes:
   a second sensor central beamsplitter at least having:
      fifth, sixth, seventh, and eighth sensor arms;
   a second sensor light source feeding a fifth sensor light beam into said fifth sensor arm, which fifth sensor light beam is split by said second sensor central beamsplitter into sixth and seventh sensor light beams traveling on said sixth and seventh sensor arms respectively;
   third means coupling said sixth and seventh sensor light beams from said sixth and seventh sensor arms into and out of said first optical pathway at said second side thereof for traverse through at least a predetermined portion of said first optical pathway to be secured by said intruder alarm subsystem;
   fourth means coupling said sixth and seventh sensor light beams out of and into said first optical pathway at said first side thereof, said sixth and seventh light beams recombining on said second sensor central beamsplitter to form a eighth sensor light beam on said eighth sensor arm;
   a second detector positioned to receive said eighth light beam from said eighth sensor arm and produce therefrom a second sensor output whose intensity is an indication of the position and amount of disturbance in said predetermined portion of said first optical pathway to be secured by said intruder alarm subsystem; and
   a signal processor connected to said first and second sensor outputs to produce therefrom a position output and a amplitude output indicative of the position and amplitude of any disturbance in said first optical pathway secured by said intruder alarm subsystem.

45. The communication system as defined in claim 44 wherein first and second sensor light sources each include:
   intensity maintenance means associated therewith.

46. The communication system as defined in claim 44 further including:
   a first length of optical fiber positioned in one of said second and third arms of said first sensor central beamsplitter whereby said one of said second and third arms of said first sensor central beamsplitter is optically longer than the other.

47. The communication system as defined in claim 46 further including:
   a second length of optical fiber positioned in one of said fifth and sixth arms of said second sensor central beamsplitter whereby said one of said fifth and sixth arms of said second sensor central beamsplitter is optically longer than the other.

48. The communication system as defined in claim 47 wherein said first and second lengths of optical fiber are essentially the same length.

49. The communication system as defined in claim 44 further including:
- a first relatively low frequency phase shifter positioned in one of said second and third arms of said first sensor central beamsplitter; and
- a second relatively low frequency phase shifter positioned in one of said fifth and sixth arms of said second sensor central beamsplitter.

50. The communication system as defined in claim 49 further including:
- a first oscillator producing a relatively low frequency output and driving said first relatively low frequency phase shifter therewith; and
- a second oscillator producing a relatively low frequency output and driving said second relatively low frequency phase shifter therewith, wherein said signal processor includes:
  - a first synchronous demodulator connected to receive said relatively low frequency output from said first oscillator and connected to receive said first sensor output from said first detector to demodulate said first sensor output; and
  - a second synchronous demodulator connected to receive said relatively low frequency output from said second oscillator and connected to receive said second sensor output from said second detector to demodulate said second sensor output.

51. The communication system as defined in claim 43 wherein said first optical pathway has:
- first and second opposite sides, and wherein said first Sagnac interferometer distributed fiber optic sensor includes:
  - a first sensor central beamsplitter at least having: first, second, third, fourth, and fifth sensor arms;
  - a first sensor light source feeding a first sensor light beam into said first sensor arm, which first sensor light beam is split by said first sensor central beamsplitter into second and third sensor light beams traveling on said second and third sensor arms respectively;
  - first means coupling said second and third sensor light beams from said second and third sensor arms into and out of said first optical pathway at said first side thereof for traverse through at least a predetermined portion of said first optical pathway to be secured by said intruder alarm subsystem;
  - second means coupling said second and third sensor light beams out of and into said first optical pathway at said second side thereof, said second and third light beams recombining on said first sensor central beamsplitter to form a fourth sensor light beam on said fourth sensor arm and a fifth sensor light beam on said fifth sensor arm;
  - a first detector positioned to receive said fourth light beam from said fourth sensor arm and produce therefrom a first output whose intensity is an indication of the position and amount of disturbance in said predetermined portion of said first optical pathway to be secured by said intruder alarm subsystem;
  - a second detector positioned to receive said fifth light beam from said fifth sensor arm and produce therefrom a second output whose intensity is an indication of the position and amount of disturbance in said predetermined portion of said first optical pathway to be secured by said intruder alarm subsystem, and wherein said second Sagnac interferometer distributed fiber optic sensor includes:
  - a second sensor central beamsplitter at least having: sixth, seventh, eighth, ninth, and tenth sensor arms;
  - a second sensor light source feeding a sixth sensor light beam into said sixth sensor arm, which sixth sensor light beam is split by said second sensor central beamsplitter into seventh and eighth sensor light beams traveling on said seventh and eighth sensor arms respectively;
  - third means coupling said seventh and eighth sensor light beams from said seventh and eighth sensor arms into and out of said first optical pathway at said second side thereof for traverse through at least a predetermined portion of said first optical pathway to be secured by said intruder alarm subsystem;
  - fourth means coupling said seventh and eighth sensor light beams out of and into said first optical pathway at said first side thereof, said seventh and eighth light beams recombining on said second sensor central beamsplitter to form a ninth sensor light beam on said ninth sensor arm and a tenth sensor light beam on said tenth sensor arm;
  - a third detector positioned to receive said ninth light beam from said ninth sensor arm and produce therefrom a third output whose intensity is an indication of the position and amount of disturbance in said predetermined portion of said first optical pathway to be secured by said intruder alarm subsystem;
  - a fourth detector positioned to receive said tenth light beam from said tenth sensor arm and produce therefrom a fourth output whose intensity is an indication of the position and amount of disturbance in said predetermined portion of said first optical pathway to be secured by said intruder alarm subsystem; and
  - a signal processor connected to said first, second, third, and fourth sensor outputs to produce therefrom a position output and a amplitude output indicative of the position and amplitude of any disturbance in said first optical pathway secured by said intruder alarm subsystem.

52. The communication system as defined in claim 51 wherein first, second, third, and fourth sensor light sources each include:
- intensity maintenance means associated therewith.

53. The communication system as defined in claim 51 further including:
- a first length of optical fiber positioned in one of said second and third arms of said first sensor whereby said one of said second and third arms of said first sensor is optically longer than the other.

54. The communication system as defined in claim 53 further including:
- a second length of optical fiber positioned in one of said seventh and eighth arms of said second sensor whereby said one of said seventh and eighth arms of said second sensor is optically longer than the other.

55. The communication system as defined in claim 54 wherein said first and second lengths of optical fiber are essentially the same length.

56. The communication system as defined in claim 51 further including:

a first relatively low frequency phase shifter positioned in one of said second and third arms of said first sensor;

a second relatively low frequency phase shifter positioned in one of said seventh and eighth arms of said second sensor.

57. The communication system as defined in claim 56 further including:

a first oscillator producing a relatively low frequency output and driving said first relatively low frequency phase shifter therewith; and a second oscillator producing a relatively low frequency output and driving said second relatively low frequency phase shifter therewith, wherein said signal processor includes:

a first synchronous demodulator connected to receive said relatively low frequency output from said first oscillator and connected to receive said first sensor output from said first detector to demodulate said first sensor output; and a second synchronous demodulator connected to receive said relatively low frequency output from said second oscillator and connected to receive said second sensor output from said second detector to demodulate said second sensor output.

58. The communication system as defined in claim 1 wherein said first arm includes:

a first optical fiber having:
a first end adjacent said first light source having: anti-reflection means to suppress reflections back toward said third and fourth arms, and wherein said second optical arm includes:

a second optical fiber having:
a second end adjacent said first detector having: anti-reflection means to suppress reflections back toward said third and fourth arms.

59. The communication system as defined in claim 1 wherein said first arm includes:

a first optical fiber having:
a first end adjacent said first light source, and wherein said second arm includes:

a second optical fiber having:
a second end adjacent said first detector, said first and second fibers being similar in length and said first and second ends reflecting similar amounts of light energy back toward said third and fourth arms.

60. The communication system as defined in claim 1 wherein said input includes:
means to integrate a first information signal that is an analog signal, whereby said communication system differentiates the integrated analog first information signal to reconstruct the analog first information signal.

61. The communication system as defined in claim 1 wherein the first information signal is an analog signal, whereby said communication system differentiates the analog first information signal into the first output signal.

62. A secure communication system including:
first optical transceiver means;
second optical transceiver means;
first and second optical fibers connected between said first and second optical transceiver means; and
a first intruder alarm subsystem including:
first and second distributed fiber optic sensors including first and second Sagnac interferometers, said first distributed fiber optic sensor being positioned to transmit light toward said second optical transceiver means and back toward said first optical transceiver means, and said second distributed fiber optic sensor being positioned to transmit light toward said first optical transceiver means and back toward said second optical transceiver means, to sense from opposite directions along said first and second optical fibers, the position of environmental effects affecting said first and second optical fibers indicative of an intruder attempting to tap into said first and second optical fibers.

63. The secure communication system as defined in claim 62 wherein said first and second optical transceiver means include:
third and fourth Sagnac interferometers.

64. The secure communication system as defined in claim 63 wherein said third Sagnac interferometer has:
a first light source operating in a first spectral band, and said fourth Sagnac interferometer has:
a second light source operating in a second spectral band discrete from said first spectral band.

65. The secure communication system as defined in claim 64 wherein said third and fourth Sagnac interferometers have:
a first common leg;
a second common leg;
first light amplifier means in said first common leg; and
second light amplifier means in said second common leg.

66. The secure communication system as defined in claim 62 wherein said first and second optical transceiver means are included in said first and second Sagnac interferometers, said first and second optical transceiver means operating at higher frequencies than said first and second distributed fiber optic sensors.

67. The secure communication system as defined in claim 62 wherein said portions of the first and second optical fibers to be secured by said first intruder alarm subsystem are in a single fiber cable, said portion of said first optical fiber to be secured by said first intruder alarm subsystem being acoustically enhanced, and said portion of said second optical fiber to be secured by said first intruder alarm subsystem being acoustically shielded.

68. The secure communication system as defined in claim 62 wherein the portions of the first and second optical fibers to be secured by said first intruder alarm subsystem are physically separated so that a particular environmental effect indicative of an intruder attempting to tap there into can occur only on one of the optical fibers.

69. The secure communication system as defined in claim 62 wherein said first distributed fiber optic sensor includes:
a first sensor central beamsplitter at least having:
first, second, third, and fourth sensor arms;
a first sensor light source feeding a first sensor light beam into said first sensor arm, which first sensor light beam is split by said first sensor central beamsplitter into second and third sensor light beams traveling on said second and third sensor arms respectively;
first means coupling said second and third sensor light beams from said second and third sensor arms into and out of said first and second optical fibers at said first side thereof for traverse through at least a predetermined portion thereof to be secured by said first intruder alarm subsystem;

second means coupling said second and third sensor light beams out of and into said first and second optical fibers at said second side thereof, said second and third light beams recombining on said first sensor central beamsplitter to form a fourth sensor light beam on said fourth sensor arm;

a first detector positioned to receive said fourth light beam from said fourth sensor arm and produce therefrom a first output whose intensity is an indication of the position and amount of disturbance in said predetermined portion of said first and second optical fibers to be secured by said first intruder alarm subsystem, and wherein said second distributed fiber optic sensor includes:

a second sensor central beamsplitter at least having: fifth, sixth, seventh, and eighth sensor arms;

a second sensor light source feeding a fifth sensor light beam into said fifth sensor arm, which fifth sensor light beam is split by said second sensor central beamsplitter into sixth and seventh sensor light beams traveling on said sixth and seventh sensor arms respectively;

third means coupling said sixth and seventh sensor light beams from said sixth and seventh sensor arms into and out of said first and second optical fibers at said second side thereof for traverse through at least a predetermined portion of said first and second optical fibers to be secured by said first intruder alarm subsystem;

fourth means coupling said sixth and seventh sensor light beams out of and into said first and second optical fibers at said first side thereof, said sixth and seventh light beams recombining on said second sensor central beamsplitter to form a eighth sensor light beam on said eighth sensor arm;

a second detector positioned to receive said eighth light beam from said eighth sensor arm and produce therefrom a second output whose intensity is an indication of the position and amount of disturbance in said predetermined portion of said first and second optical fibers to be secured by said first intruder alarm subsystem; and a signal processor connected to said first and second sensor outputs to produce therefrom a position output and a amplitude output indicative of the position and amplitude of any disturbance in said first and second optical fibers secured by said first intruder alarm subsystem.

70. The secure communication system as defined in claim 69 wherein the portions of said first and second optical fibers to be secured by said first intruder alarm subsystem are in a single fiber cable, the portion of said first optical fiber to be secured by said first intruder alarm subsystem being covered with an acoustic enhancing coating, and portion of said second optical fiber to be secured by said first intruder alarm subsystem being covered with acoustic shielding.

71. The secure communication system as defined in claim 69 wherein the portion of said first and second optical fibers to be secured by said first intruder alarm subsystem are physically separated so that a particular environmental effect indicative of an intruder attempting to tap there into can occur only on one of the optical fibers.

72. The secure communication system as defined in claim 62 wherein said first and second optical fibers have:

first and second opposite sides, and wherein said first distributed fiber optic sensor includes:

a first sensor central beamsplitter at least having: first, second, third, fourth, and fifth sensor arms;

a first sensor light source feeding a first sensor light beam into said first sensor arm, which first sensor light beam is split by said first sensor central beamsplitter into second and third sensor light beams traveling on said second and third sensor arms respectively;

first means coupling said second and third sensor light beams from said second and third sensor arms into and out of said first and second optical fibers at said first side thereof for traverse through at least a predetermined portion of said first and second optical fibers to be secured by said first intruder alarm subsystem;

second means coupling said second and third sensor light beams out of and into said first and second optical fibers at said second side thereof, said second and third light beams recombining on said first sensor central beamsplitter to form a fourth sensor light beam on said fourth sensor arm and a fifth sensor light beam on said fifth sensor arm;

a first detector positioned to receive said fourth light beam from said fourth sensor arm and produce therefrom a first output whose intensity is an indication of the position and amount of disturbance in said predetermined portion of said first and second optical fibers to be secured by said first intruder alarm subsystem;

a second detector positioned to receive said fifth light beam from said fifth sensor arm and produce therefrom a second output whose intensity is an indication of the position and amount of disturbance in said predetermined portion of said first and second optical fibers to be secured by said first intruder alarm subsystem, and wherein said second distributed fiber optic sensor includes:

a second sensor central beamsplitter at least having: sixth, seventh, eighth, ninth, and tenth sensor arms;

a second sensor light source feeding a sixth sensor light beam into said sixth sensor arm, which sixth sensor light beam is split by said second sensor central beamsplitter into seventh and eighth sensor light beams traveling on said seventh and eighth sensor arms respectively;

third means coupling said seventh and eighth sensor light beams from said seventh and eighth sensor arms into and out of said first and second optical fibers at said second side thereof for traverse through at least a predetermined portion of said first and second optical fibers to be secured by said first intruder alarm subsystem;

fourth means coupling said seventh and eighth sensor light beams out of and into said first and second optical fibers at said first side thereof, said seventh and eighth light beams recombining on said second sensor central beamsplitter to form a ninth sensor light beam on said ninth sensor arm and a tenth sensor light beam on said tenth sensor arm;

a third detector positioned to receive said ninth light beam from said ninth sensor arm and produce therefrom a third output whose intensity is an indication of the position and amount of disturbance in said predetermined portion of said first and second optical fibers to be secured by said first intruder alarm subsystem;

a fourth detector positioned to receive said tenth light beam from said tenth sensor arm and produce therefrom a fourth output whose intensity is an indication of the position and amount of disturbance in said predetermined portion of said first and second optical fibers to be secured by said first intruder alarm subsystem; and a signal processor connected to said first, second, third, and fourth sensor outputs to produce therefrom a position output and a amplitude output indicative of the position and amplitude of any disturbance in said first and second optical fibers secured by said first intruder alarm subsystem.

73. The secure communication system as defined in claim 62 wherein first and second optical transceiver means include:

third and fourth Sagnac interferometers each having:
Sagnac loops, each Sagnac loop of said third and fourth Sagnac interferometers having:
phase shifter means therein connected to impress data there into.

74. The secure communication system as defined in claim 73 wherein said Sagnac loop of at least said third Sagnac interferometer includes:

means to split a beam of light into at least two beams of light that counter propagate about said Sagnac loop of said third Sagnac interferometer; and means to change the length of said Sagnac loop of at least said third Sagnac interferometer positioned generally opposite to said means to split a beam of light.

75. The secure communication system as defined in claim 74 wherein said means to change the length of said Sagnac loop of at least said third Sagnac interferometer include:

control means connected to said means to change the length of said Sagnac loop of at least said third Sagnac interferometer to coordinate pathlength changes with the transmission of the information over said system so that information is not lost during a pathlength change;

a piezoelectric cylinder;

means to provide different voltages to said piezoelectric cylinder connected to said control means; and an optical fiber that is part of said Sagnac loop of said third Sagnac interferometer wrapped around said piezoelectric cylinder.

76. The secure communication system as defined in claim 74 wherein said means to change the length of said Sagnac loop of at least said third Sagnac interferometer further include:

control means connected to said means to change the length of said Sagnac loop of at least said third Sagnac interferometer to coordinate pathlength changes with transmission of the information thereover so that information is not lost during a pathlength change;

a variable pathlength changer;

means to control the amount of pathlength change said variable pathlength changer makes to said Sagnac loop of at least said third Sagnac interferometer;

at least one optical switch in said Sagnac loop of at least said third Sagnac interferometer adjacent said variable pathlength changer; and at least one length of optical fiber connected to said optical switch so that said optical switch can add and remove said at least one length of optical fiber to said Sagnac loop of at least said third Sagnac interferometer.

77. The secure communication system as defined in claim 74 wherein said means to change the length of said Sagnac loop of at least said third Sagnac interferometer include:

control means connected to said means to change the length of said Sagnac loop of at least said third Sagnac interferometer to coordinate pathlength changes with transmission of the information thereover so that information is not lost during a pathlength change;

at least one optical switch in said Sagnac loop of at least said third Sagnac interferometer; and at least one length of optical fiber connected to said optical switch so that said optical switch can add and remove said at least one length of optical fiber to said Sagnac loop of at least said third Sagnac interferometer.

78. The secure communication system as defined in claim 73 wherein at least said Sagnac loop of said third Sagnac interferometer includes:

means to split a beam of light into at least two beams of light that counter propagate about said Sagnac loop of said third Sagnac interferometer;

a first alarm tap connected thereto at a predetermined location from said means to split a beam of light;

first alarm sensor means to measure the intensity of any light tapped off said Sagnac loop of said third Sagnac interferometer by said first alarm tap and produce an alarm output whenever the tapped light intensity is out of a predetermined range;

a second alarm tap connected thereto at said predetermined location from said means to split a beam of light on the opposite side of said Sagnac loop of said third Sagnac interferometer; and second alarm sensor means to measure the intensity of any light tapped off said Sagnac loop of said third Sagnac interferometer by said second alarm tap and produce an alarm output whenever the tapped light intensity is out of a predetermined range.

79. The secure communication system as defined in claim 73 wherein at least said Sagnac loop of said third Sagnac interferometer includes:

means to split a beam of light into at least two beams of light that counter propagate about said Sagnac loop of said third Sagnac interferometer;

a first alarm tap connected thereto at a predetermined location from said means to split a beam of light;

first alarm sensor means to measure the intensity of any light tapped off said Sagnac loop of said third Sagnac interferometer by said first alarm tap and produce output therefrom;

a second alarm tap connected thereto at said predetermined location from said means to split a beam of light on the opposite side of said Sagnac loop of said third Sagnac interferometer; and second alarm sensor means to measure the intensity of any light tapped off said Sagnac loop of said third Sagnac interferometer by said first alarm tap and produce output therefrom; and comparison means connected to receive said outputs from said first and second alarm sensor means to produce therefrom an alarm output whenever said outputs of said first and second alarm sensor means differ by more than a predetermined amount.

80. The secure communication system as defined in claim 73 wherein at least said Sagnac loop of said third Sagnac interferometer includes:
means to split a beam of light into at least two beams of light that counter propagate about said Sagnac loop of said third Sagnac interferometer;
an alarm beamsplitter connected thereto at the opposite side of the Sagnac loop of said third Sagnac interferometer from said means to split a beam of light, said alarm beamsplitter having:
first and second arms in said Sagnac loop of said third Sagnac interferometer; and
third and fourth arms;
first alarm sensor means to measure the intensity of light on said third arm and producing an alarm output therefrom; and
second alarm sensor means to measure the intensity of light on said third arm and producing an alarm output therefrom.

81. The secure communication system as defined in claim 73 wherein at least said Sagnac loop of said third Sagnac interferometer includes:
means to split a beam of light into at least two beams of light that counter propagate about said Sagnac loop of said third Sagnac interferometer;
at least one first alarm tap connected thereto at a predetermined location from said means to split a beam of light to tap off light in a narrow spectrum;
first alarm sensor means to measure the intensity of any light tapped off said Sagnac loop of said third Sagnac interferometer by said first alarm tap and produce an alarm output therefrom;
at least one second alarm tap connected thereto at a predetermined location from said means to split a beam of light to tap off light in a narrow spectrum; and
second alarm sensor means to measure the intensity of any light tapped off said Sagnac loop of said third Sagnac interferometer by said first alarm tap and produce an alarm output therefrom.

82. The secure communication system as defined in claim 73 wherein at least said Sagnac loop of said third Sagnac interferometer includes:
means to split a beam of light into at least two beams of light that counter propagate about said Sagnac loop of said third Sagnac interferometer;
at least one first dispersive alarm tap connected thereto at a predetermined location from said means to split a beam of light to tap off light in separate narrow spectrums;
first alarm sensor means to measure the intensity of at least one spectrum of any light tapped off said Sagnac loop of said third Sagnac interferometer by said first dispersive alarm tap and produce a first alarm output therefrom;
at least one second dispersive alarm tap connected thereto at a predetermined location from said means to split a beam of light to tap off light in separate narrow spectrums; and
second alarm sensor means to measure the intensity of at least one spectrum of any light tapped off said Sagnac loop of said third Sagnac interferometer by said second dispersive alarm tap and produce a second alarm output therefrom.

83. The secure communication system as defined in claim 73 wherein at least said third Sagnac interferometer includes:
alarm sensor means to measure the average intensity of at least one spectrum of any light output of said third Sagnac interferometer and to produce a alarm output therefrom whenever said average intensity is out of a predetermined range.

84. The secure communication system as defined in claim 83 wherein at least said third Sagnac interferometer includes:
a source of a first light beam;
beamsplitter means to split said first beam of light into at least second and third beams of light that counter propagate about said Sagnac loop of said third Sagnac interferometer for phase shifting by said phase shifter means before return to said beamsplitter means for combining into a fourth beam of light;
means in said Sagnac loop of said third Sagnac interferometer for impressing a relatively low frequency signal on said second and third light beams; and
means for determining the average intensity of said relatively low frequency signal and to produce a alarm output therefrom whenever said average intensity is out of a predetermined range.

85. The secure communication system as defined in claim 62 wherein said first and second Sagnac interferometers each have:
a light source;
a 3 by 3 coupler connected to receive light from said light source and provide the light to said first and second optical fibers;
bypass means to transmit light around said 3 by 3 coupler of said other of said first and second Sagnac interferometers so that the light returns to said 3 by 3 coupler; and
a pair of detectors positioned to receive the returning light and to produce first and second intruder signals therefrom, said secure communication system including:
computational means connected to receive said first and second intruder signals from said first and second intruder signals to produce therefrom the location of an intruder.

86. The secure communication system as defined in claim 85 wherein said first and second optical transceiver means include:
third and fourth Sagnac interferometers each having:
a communication light source producing a first communication light beam;
means to split said first communication light beam into second and third communication light beams;
means to couple said second and third communication light beams onto said first and second optical fibers;
bypass means to transmit second and third communication light beams around said means to split of said other of said third and fourth Sagnac interferometers so that said second and third communication light beams return to said means to split;
phase modulator means to impress information on said second and third communication light beams; and
detector means positioned to receive said second and third communication light beams after their return to said means to split to extract the information therefrom.

87. The secure communication system as defined in claim 85 wherein said first optical fiber is acoustically enhanced and said second optical fiber is acoustically shielded.

88. The secure communication system as defined in claim 85 wherein said first optical fiber is physically spaced from said second optical fiber.

89. The secure communication system as defined in claim 85 wherein said first and second optical fibers run adjacent two each other, said first and second distributed fiber optic sensors each including:
   means to shift the length of one of said first and second optical fibers with respect to the other positioned adjacent said 3 by 3 coupler.

90. A communication system including:
   a Sagnac interferometer including:
      an optical loop;
      a light source; and
      means optically connected to said light source for producing counter propagating light beams on said optical loop, for receiving said counter propagating light beams, and for producing therefrom an interferometric output;
   an optical phase modulator remote from said means and in said optical loop for impressing information on said counter propagating light beams so that said information appears in the interferometric output; and
   an output light detector optically connected to said optical loop for receiving the interferometric output and for producing therefrom an output signal representative of the information.

91. The communication system of claim 90 wherein said optical loop has:
   first and second portions on opposite sides of said optical phase modulator, said communication system further including:
      a first Sagnac interferometer distributed sensor having:
         a second light source positioned generally adjacent said optical phase modulator and connected to transmit light over said first and second portions of said optical loop;
      a second Sagnac interferometer distributed sensor having:
         a third light source positioned generally adjacent said optical phase modulator and connected to transmit light over said first and second portions of said optical loop; and
      a signal processor connected to said first and second Sagnac interferometer distributed sensors for calculating the amplitude and position of effects that occur to said first portion of said optical loop.

92. The communication system of claim 90 further including:
   an intruder alarm subsystem including:
      first and second Sagnac interferometer distributed fiber optic sensors positioned to sense effects indicative of an intruder from different locations about said optical loop.

93. A secure communication system including:
   first optical transceiver means;
   second optical transceiver means;
   first and second optical fibers connected between said first and second optical transceiver means; and
   an intruder alarm subsystem including:
      an alarm;
      a first Sagnac interferometer distributed fiber optic sensor positioned adjacent said first optical transceiver means for sensing effects indicative of an intruder at said first optical fiber and producing first outputs therefrom;
      a second Sagnac interferometer distributed fiber optic sensor positioned adjacent said second optical transceiver means for sensing effects indicative of an intruder at said first optical fiber and producing second outputs therefrom; and
      means for combining the first and second outputs, determining therefrom the location along said first optical fiber of the effects indicative of an intruder, and activating said alarm.

* * * * *